US011283593B2

(12) United States Patent
Satpathy

(10) Patent No.: US 11,283,593 B2
(45) Date of Patent: Mar. 22, 2022

(54) ADAPTIVE SIGNAL SYNCHRONIZATION AND GLITCH SUPPRESSION FOR ENCRYPTION ENGINES

(71) Applicant: Facebook Technologies, LLC, Menlo Park, CA (US)

(72) Inventor: Sudhir Satpathy, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 193 days.

(21) Appl. No.: 16/446,209

(22) Filed: Jun. 19, 2019

(65) Prior Publication Data

US 2020/0403774 A1 Dec. 24, 2020

(51) Int. Cl.
| H04L 29/06 | (2006.01) |
| H04L 9/06 | (2006.01) |
| H04L 9/08 | (2006.01) |

(52) U.S. Cl.
CPC .......... *H04L 9/0631* (2013.01); *H04L 9/0637* (2013.01); *H04L 9/0822* (2013.01); *H04L 2209/12* (2013.01); *H04L 2209/60* (2013.01)

(58) Field of Classification Search
CPC ............. H04L 2209/125; H04L 9/0637; H04L 9/0631; G06F 21/72; G06F 12/1408
See application file for complete search history.

(56) References Cited

U.S. PATENT DOCUMENTS

| 10,747,700 | B1 | 8/2020 | Sarusi et al. |
| 2003/0223580 | A1 | 12/2003 | Snell |
| 2007/0071236 | A1 | 3/2007 | Kohnen |
| 2009/0168999 | A1 | 7/2009 | Boswell et al. |
| 2010/0150350 | A1 | 6/2010 | Reidenbach |
| 2010/0153747 | A1 | 6/2010 | Asnaashari et al. |

(Continued)

FOREIGN PATENT DOCUMENTS

| CN | 108282494 A | 7/2018 |
| EP | 2793155 A1 | 10/2014 |
| WO | 2017/052980 A1 | 3/2017 |

OTHER PUBLICATIONS

Moradi et al. "Glitch-Free Implementation of Masking in MOdern FPGAs," 2012 IEEE International Symposium on Hardware-Oriented Security and Trust, Jun. 3-4, 2012, pp. 89-95 (Year: 2012).*

(Continued)

*Primary Examiner* — Jason K Gee
(74) *Attorney, Agent, or Firm* — Shumaker & Sieffert, P.A.

(57) ABSTRACT

In general, this disclosure describes encryption engines that adaptively synchronize signals and suppress glitch propagation in a data decryption pipeline. An apparatus includes a decryption data path having a plurality of computational stages arranged in a pipeline configured to decrypt an encrypted block of data to form a decrypted block of data. One of the computational stages included in the pipeline of the decryption data path includes multiple asymmetric logical paths. A first signal traverses a first logical path and a second signal traverses a second logical path having a greater number of logical units than the first logical path. A glitch suppression register of the apparatus is configured to synchronize the first signal with respect to the second signal such that the first signal and the second signal arrive at a downstream logic element of the computational stage of the decryption data path at substantially a same time.

18 Claims, 12 Drawing Sheets

(56) References Cited

U.S. PATENT DOCUMENTS

| | | | |
|---|---|---|---|
| 2014/0074719 A1 | 3/2014 | Gressel et al. | |
| 2014/0351896 A1* | 11/2014 | Koo | G02B 27/017 |
| | | | 726/4 |
| 2015/0161401 A1 | 6/2015 | Na et al. | |
| 2015/0222421 A1 | 8/2015 | Guo et al. | |
| 2016/0203342 A1 | 7/2016 | Matsuo | |
| 2017/0092157 A1* | 3/2017 | Christiansen | H04L 9/0631 |
| 2017/0315608 A1 | 11/2017 | Shanware | |

OTHER PUBLICATIONS

U.S. Appl. No. 16/597,591, filed Oct. 9, 2019, by Satpathy.
U.S. Appl. No. 16/506,618, filed Jul. 9, 2019, by Atlas et al.
U.S. Appl. No. 16/446,140, filed Jun. 19, 2019, by Satpathy.
U.S. Appl. No. 16/446,187, filed Jun. 19, 2019, by Satpathy.
International Search Report and Written Opinion of International Application No. PCT/US2020/036132, dated Sep. 11, 2020, 13 pp.
Moradi et al., "Glitch-Free Implementation of Masking in Modern FPGAs," 2012 IEEE International Symposium on Hardware-Oriented Security and Trust, Jun. 3-4, 2012, pp. 89-95.
Kenney, "Energy Efficiency Analysis and Implementation of AES on an FPGA", A thesis presented to the University of Waterloo in fulfillment of the thesis requirement for the degree of Master of Applied Science in Electrical and Computer Engineering, Jan. 1, 2008, 84 pp.
"Announcing the Advanced Encryption Standard (AES)," Federal Information Processing Standards Publication 197, Nov. 26, 2001, 51 pp.
Rouse, "Block Cipher," accessed from https://searchsecurity.techtarget.com/definition/block-cipher, last updated Jan. 4, 2006, 1 pp.
U.S. Appl. No. 17/366,750, filed Jul. 2, 2021, by Satpathy.

* cited by examiner

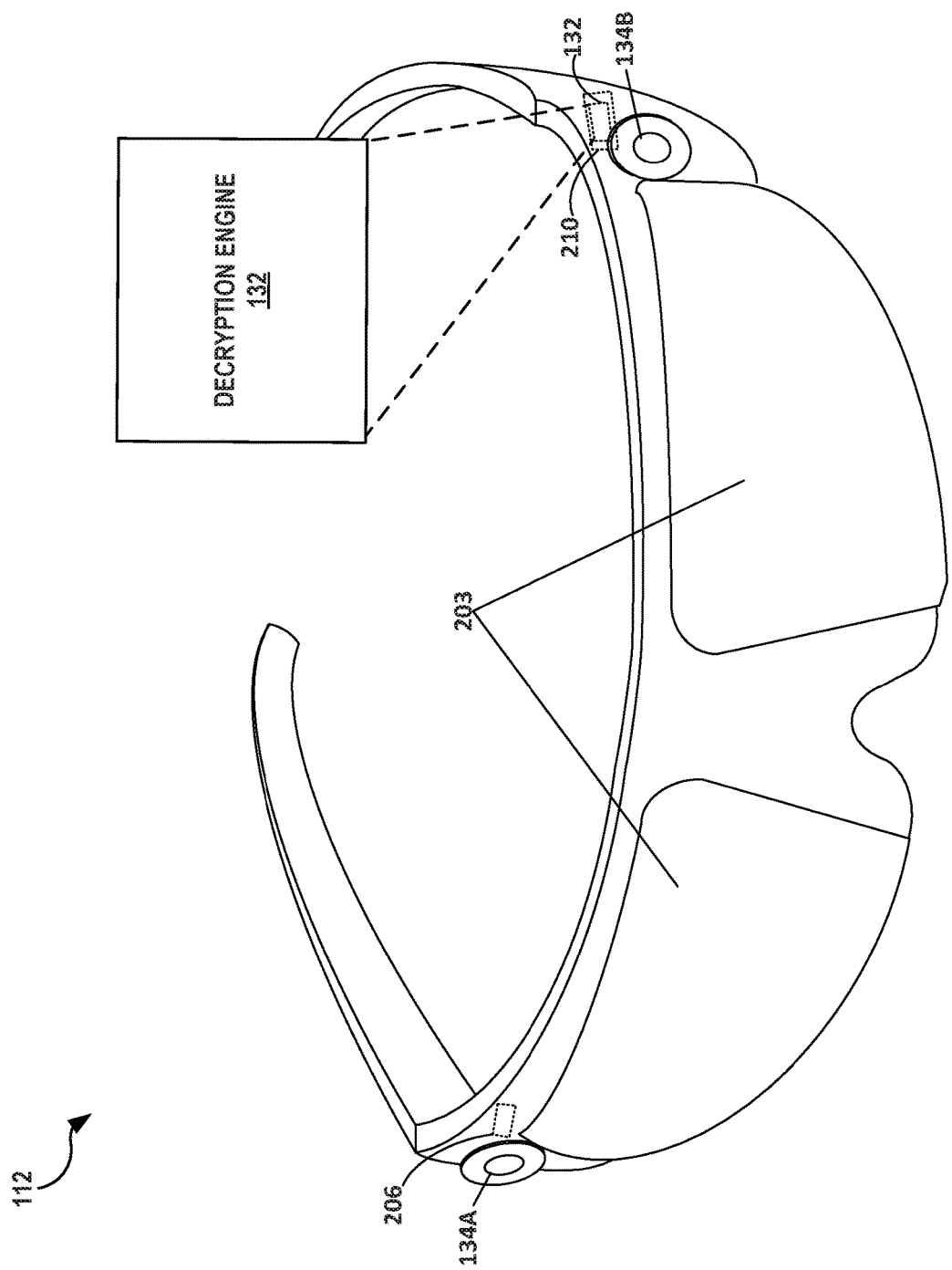

ADAPTIVE SIGNAL SYNCHRONIZATION AND GLITCH SUPPRESSION FOR ENCRYPTION ENGINES

TECHNICAL FIELD

This disclosure generally relates to encryption and decryption implemented in various types of computing systems.

BACKGROUND

Many computing systems, including those that receive content over networks, incorporate content protection or digital rights management technology that includes data decryption and encryption hardware and software. This encryption protects secure data, which is potentially sensitive, private, and/or right-managed and is stored or used on the system, from unauthorized access and exploitation.

SUMMARY

Encryption and decryption operations, however, are often computationally intensive and may significantly adversely impact performance and power consumption of components of various computing systems, such as those that are battery-powered. Some examples of these computing systems include artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include completely-generated content or generated content combined with captured content (e.g., real-world video and/or images). Decryption operations are often computationally intensive and may significantly adversely impact performance and power consumption of components of artificial reality systems, such as HMDs or other battery-powered content rendering devices.

In general, this disclosure describes encryption engines having a partitionable data path in which all or a subset of a set of data path encryption/decryption circuits are selectively enabled. The encryption engines of this disclosure seamlessly enable or disable individual encryption or decryption circuits within a partitionable data path to dynamically and adaptively change encryption/decryption modes. The encryption engines of this disclosure operate the partitioned encryption/decryption circuits without data inter-dependencies across the partitions, thereby permitting for individually enabling or disabling the circuits, while allowing enabled circuits to operate agnostic of cross-partition enablement status. By way of example, this disclosure focuses on the decryption capabilities of these encryption engines, particularly for use in battery-powered devices such as HMDs of artificial reality systems Examples of decryption mode options include 'full decryption' in which all frames (video frames, audio frames, or both) undergo decryption, or 'sample decryption' in which only a portion of the frames undergo decryption to meet a time-varying maximum bit-rate for reliable data transfer. The full and sample decryption modes represent generally reciprocal operating modes in reference to full and sample encryption modes of this disclosure. The reconfigurable decryption engine of this disclosure splits a master clock controlling the encryption engine's operation into multiple individual sub-clocks for each partitioned decryption circuit of the data path. The decryption engine may operate the sub-clocks concurrently according to different permutations and combinations of custom rates, such as at a full frequency for the full decryption mode, or at reduced rates, (e.g., half frequency, quarter frequency, etc.) to reduce power consumption.

Some aspects of this disclosure are directed to a decryption engine that implements adaptive glitch suppression. In these examples, the decryption engine of this disclosure includes glitch-suppressing flip flops or latches (collectively, glitch-suppression registers) in processing pipelines in order to synchronize asymmetric signal paths. In this way, the glitch-suppression registers latches may reduce the switching activity that typically occurs between clock cycles in asymmetric signal paths and, thus, reduce power consumption by the decryption engine. In one example, the decryption engine of this disclosure may utilize the glitch-suppression registers to synchronize data path signals within an inverse substitute byte ("Sbox") stage of pipelined decryption. In this way, the decryption engine of this disclosure may reduce or eliminate asymmetry after traversing an inversion unit and prior to entering a multiplication unit. In some examples, the decryption engine of this disclosure controls the glitch-suppression registers in an adaptive manner such that, when operating at lower frequencies, the decryption engine bypasses one or more secondary (or "slave") latches while retaining a primary (or "master") latch. An encryption engine may also implement the glitch suppressing designs of this disclosure in a reciprocal Sbox stage of pipelined encryption.

In one example, this disclosure is directed to an apparatus for data decryption. The apparatus includes an interface configured to receive an encrypted block of data, and a decryption data path. The decryption data path has a plurality of computational stages arranged in a pipeline configured to decrypt the encrypted block of data to form a decrypted block of data. At least one of the computational stages included in the pipeline of the decryption data path includes: multiple asymmetric logical paths, where a first signal traverses a first logical path and a second signal traverses a second logical path having a greater number of logical units than the first logical path, and a glitch suppression register configured to synchronize the first signal with respect to the second signal such that the first signal and the second signal arrive at a downstream logic element of the at least one computational stage of the decryption data path at substantially a same time.

In another example, this disclosure is directed to a decryption integrated circuit (IC). The decryption IC includes an interface configured to receive an encrypted block of data, and a decryption data path having a plurality of computational stages arranged in a pipeline configured to decrypt the encrypted block of data to form a decrypted block of data. At least one computational stage included in the pipeline of the decryption data path includes: multiple asymmetric logical paths, where a first signal traverses a first logical path and a second signal traverses a second logical path having a greater number of logical units than the first logical path, and a glitch suppression register configured to synchronize the first signal with respect to the second signal such that the first signal and the second signal arrive at a downstream logic element of the at least one computational stage of the decryption data path at substantially a same time.

In another example, this disclosure is directed to an artificial reality system. The artificial reality system includes a decryption data path having a plurality of computational stages arranged in a pipeline configured to decrypt an encrypted block of data to form a decrypted block of data. At least one of the computational stages included in the pipeline of the decryption data path includes: multiple asymmetric logical paths, where a first signal traverses a first logical path and a second signal traverses a second logical path having a greater number of logical units than the first logical path, and a glitch suppression register configured to synchronize the first signal with respect to the second signal such that the first signal and the second signal arrive at a downstream logic element of the at least one computational stage of the decryption data path at substantially a same time. The artificial reality system further includes a head-mounted display (HMD) configured to output artificial reality content including the decrypted block of data.

In another example, this disclosure is directed to an artificial reality system. The artificial reality system includes an encryption data path having a plurality of computational stages arranged in a pipeline configured to encrypt a block of input data to form an encrypted block of data. At least one of the computational stages included in the pipeline of the encryption data path includes: multiple asymmetric logical paths, where a first signal traverses a first logical path and a second signal traverses a second logical path having a greater number of logical units than the first logical path, and a glitch suppression register configured to synchronize the first signal with respect to the second signal such that the first signal and the second signal arrive at a downstream logic element of the at least one computational stage of the encryption data path at substantially a same time. The artificial reality system further includes a head-mounted display (HMD) configured to output the encrypted block of data The system configurations and techniques of this disclosure provide encryption and decryption engines that can be reconfigured or tuned seamlessly to deliver performance goals while meeting overall system power efficiency goals. That is, by operating below a highest performance level at certain times, while maintaining encryption performance, the reconfigurable encryption engines of this disclosure reduce power consumption over the overall period of operation. The reconfigurable encryption engine does not introduce additional infrastructure to deliver these enhancements, in that no logic overhead is required. The techniques of this disclosure may be implemented in various types of hardware, such as a system on a chip (SoC), in an application specific integrated circuit (ASIC), or in a field-programmable gate array (FPGA). The decryption engine of this disclosure provides various power-saving improvements when implemented in artificial reality systems, as a non-limiting example.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 2B is an illustration depicting another example of an HMD configured to operate in accordance with the techniques of the disclosure.

DETAILED DESCRIPTION

Many content provider systems, such as streaming systems, incorporate content protection or digital rights management technology that includes data encryption. The digital data encryption implemented by content provider systems may follow various standardized encryption mechanisms. The content consuming devices that receive the encrypted content perform generally reciprocal or "inverse" steps with respect to the encryption mechanisms, in accordance with the inverse steps specified in the corresponding standard according to which the data was encrypted. This disclosure primarily describes decryption-side functionalities performed by content consuming devices configured according to aspects of this disclosure. It will be appreciated, however, that aspects of this disclosure provide benefits when implemented with respect to encryption-side functionalities of digital content protection.

Figure 1A:
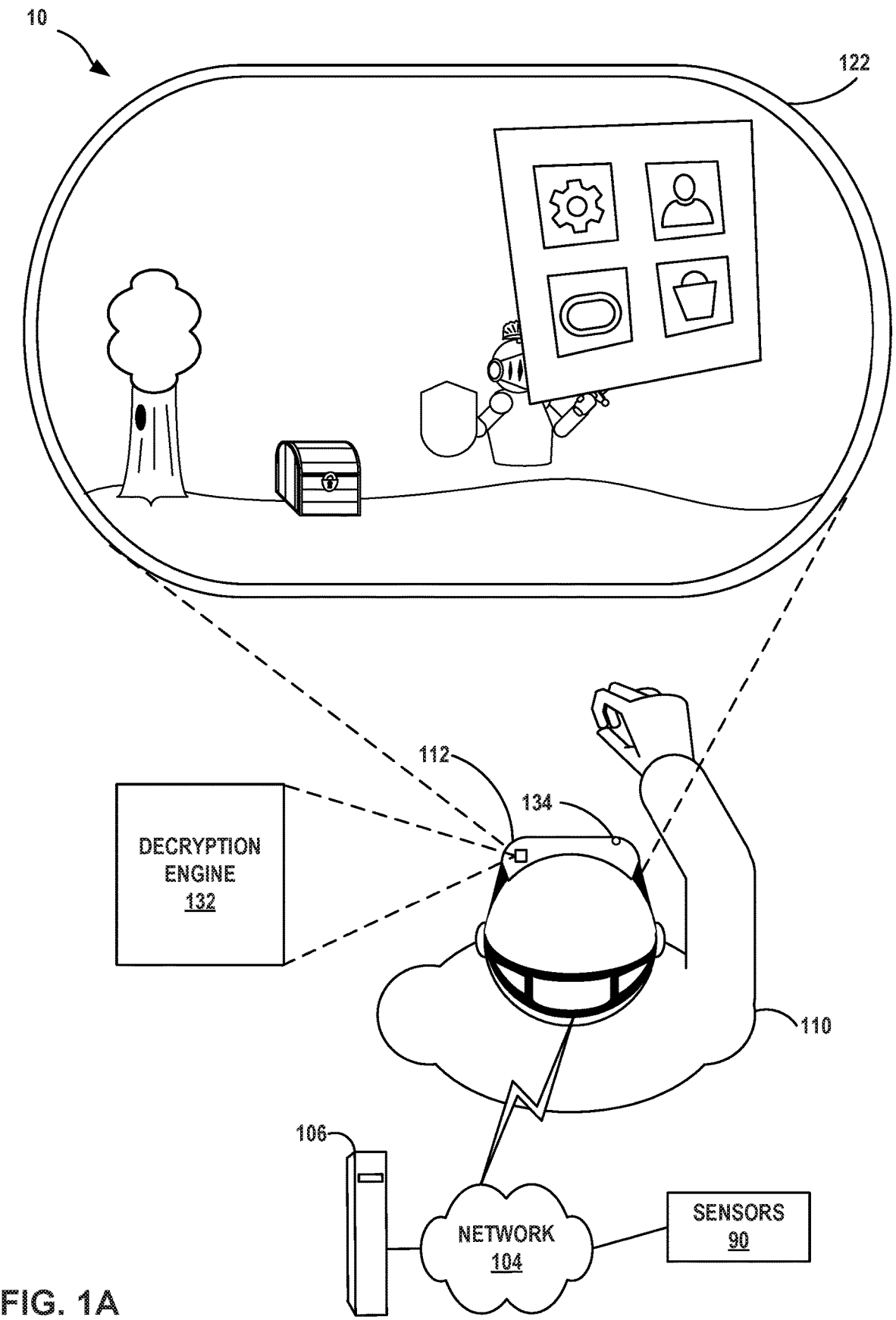
FIG. 1A is an illustration depicting an example artificial reality system that implements scalable, partitioned decryption of encrypted digital content in accordance with aspects of this disclosure.

FIG. 1A is an illustration depicting an example artificial reality system 10 that implements scalable, partitioned decryption of encrypted digital content in accordance with aspects of this disclosure. In some examples, artificial reality system 10 also implements adaptive glitch suppression within particular stages of a pipelined decryption process by stabilizing some electrical signals before propagating the electrical signals to downstream components (computational stages) of a pipelined data path of an encryption engine. By implementing the scalable partitionable decryption techniques of this disclosure and/or the adaptive glitch suppression techniques of this disclosure, artificial reality system 10 conserves energy by reducing power consumption, while maintaining decryption integrity.

Artificial reality system 10 reduces power needs for decrypting encrypted content received for an artificial reality experience, while maintaining compliance with the standardized decryption mechanisms described in the advanced encryption standard (AES) established by the United States National Institute of Standards and Technology (NIST). For instance, artificial reality system 10 may enhance AES-based decryption technology to better suit AES-compliant decryption engines for deployment in wearable devices of artificial reality systems, such as head-mounted displays (HMDs), e.g., headsets or glasses, or consoles that are communicatively coupled to these wearable devices. The decryption engine of this disclosure may operate under stringent power budgets, which is often a constraint in the context of wearable devices of artificial reality systems.

While the adaptive decryption techniques of this disclosure are described with respect to being implemented within artificial reality system 10 as an example, it will be appreciated that the applicability of the decryption techniques of this disclosure are not limited to artificial reality systems. The decryption techniques of this disclosure or reciprocal encryption techniques may be implemented to improve performance in other types of computing devices, including, but not limited to, various types of battery-powered system-on-a-chip (SoC)-driven and/or application specific integrated circuit (ASIC)-driven technologies. Again, the scalable partitionable decryption datapaths and the glitch-suppressing decryption techniques of this disclosure, whether implemented in combination or individually, reduce energy expenditure in comparison to existing technologies in a number of ways, as discussed below in further detail.

In the example of FIG. 1A, artificial reality system 10 includes head mounted device (HMD) 112, console 106 and, in some examples, one or more external sensors 90. As shown, HMD 112 is typically worn by user 110 and includes an electronic display and optical assembly for presenting artificial reality content 122 to user 110. In addition, HMD 112 includes one or more sensors (e.g., accelerometers) for tracking motion of HMD 112. HMD 112 may include one or more image capture devices 134, e.g., cameras, line scanners, and the like. Image capture devices 134 may be configured for capturing image data of the surrounding physical environment. In this example, console 106 is shown as a single computing device, such as a gaming console, workstation, a desktop computer, or a laptop.

In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as a WiFi® or 5G® based network, an Ethernet® network, a mesh network or a short-range wireless (e.g., Bluetooth®) communication medium. Although HMD 112 is shown in this example as being in communication with (e.g., tethered to or in wireless communication with) console 106, in some implementations HMD 112 operates as a standalone, mobile artificial reality system. During operation, the artificial reality application constructs artificial reality content 122 for display to user 110 by tracking and computing pose information for a frame of reference, typically a viewing perspective of HMD 112. Artificial reality system 10 may use external sensors 90, external cameras 102, etc. to capture 3D information within the real world, physical environment.

According to the techniques of this disclosure, artificial reality system 10 incorporates scalable, partitionable decryption technology to decrypt content prior to rendering and presenting the content to user 110. Artificial reality system 10 is described herein as incorporating reconfigurable decryption engine 132 in HMD 112. According to the configurations and designs of this disclosure, decryption engine 132 may switch to a different operating mode (e.g. with a new power consumption level) within a single clock cycle, and continue operating in the new operating mode/power level for a significant length of time (e.g., several clock cycles) before any further power level transitions, thereby alleviating energy inefficiencies arising from frequent power level transitions.

In accordance with aspects of this disclosure, decryption engine 132 comprises an AES-compliant decryption datapath partitioned to form multiple non-interdependent decryption sub-datapaths in that no single decryption sub-datapath has any data interdependency with respect to any other decryption sub-datapath resulting from the partitioning. Decryption engine 132 may selectively enable one or more of the non-interdependent decryption sub-datapaths to decrypt a block of encrypted data according to a given decryption mode.

For instance, the AES-compliant decryption datapath of decryption engine 132 may be partitioned into multiple, discrete, inverse (or "backward") mix columns that do not have interdependencies among one another. Various configurations of this disclosure enable decryption engine 132 to implement partitioned sub-datapaths with respect to different AES-compliant key sizes, such as 128-bit, 192-bit, or 256-bit cipher key sizes. For example, decryption engine 132 may partition a 128-bit (16-byte) decryption datapath into four non-interdependent datapaths. The in-engine compartmentalization of this example enables decryption engine 132 to selectively enable or disable one or more of the sub-datapaths at given time instances, without compromising data precision of an enabled datapath, which progresses independently of any disabled datapath(s) according to aspects of this disclosure. For different sizes of input blocks, various configurations of this disclosure may enable decryption engine 132 to have either a greater number of sub-datapaths, or to have sub-datapaths that process different word sizes.

For example, decryption engine 132 may implement four internal clocks, one for each partition. Decryption engine 132 can potentially implement one or more of the four internal clocks at reduced frequencies, thereby reducing power consumption on an engine-wide basis during decryption. By running the four internal clocks separately and at reduced frequencies and time-shifted rising clock edges, decryption engine 132 may potentially enable a subset of the sub-datapaths while disabling the remaining sub-datapath(s) at a given instance of time, such that not all of the four sub-datapaths are producing output data at every clock cycle, thereby operating the decryption engine in a word serial manner in which one or more words of the overall round operation are output serially by different sub-data paths.

In some implementations, decryption engine 132 may incorporate energy-saving glitch suppression combinatorial and sequential logic within the data decryption pipeline. Glitch-suppressing flip flops of this disclosure enable decryption engine 132 to implement an altered processing pipeline by which asymmetric signals are synchronized within each inverse substitute byte ("Sbox") component of the decryption datapath. For example, the glitch-suppressing configurations of this disclosure enable decryption engine 132 to alter the use of existing latch infrastructure of a given inverse Sbox to synchronize electrical signals and reduce the occurrence of switching activity within that particular inverse Sbox. By incorporating the glitch-suppressing design attributes of this disclosure, decryption engine 132 enables artificial reality system 10 to reduce power consumption expended during the process of decrypting encrypted data received over network 104, while preserving the integrity and quality of the decrypted output itself.

While shown in FIG. 1A and described above as being included in HMD 112, decryption engine 132 may be included in console 106 in some examples. In these examples, console 106 invokes decryption engine 132 to perform the partitioned decryption of encrypted data received over network 104, and communicates the decrypted output of decryption engine 132 to HMD 112. A content provider may implement encryption techniques of this disclosure that are generally reciprocal to the dynamically-reconfigurable decryption techniques described above with respect to decryption engine 132.

Figure 1B:
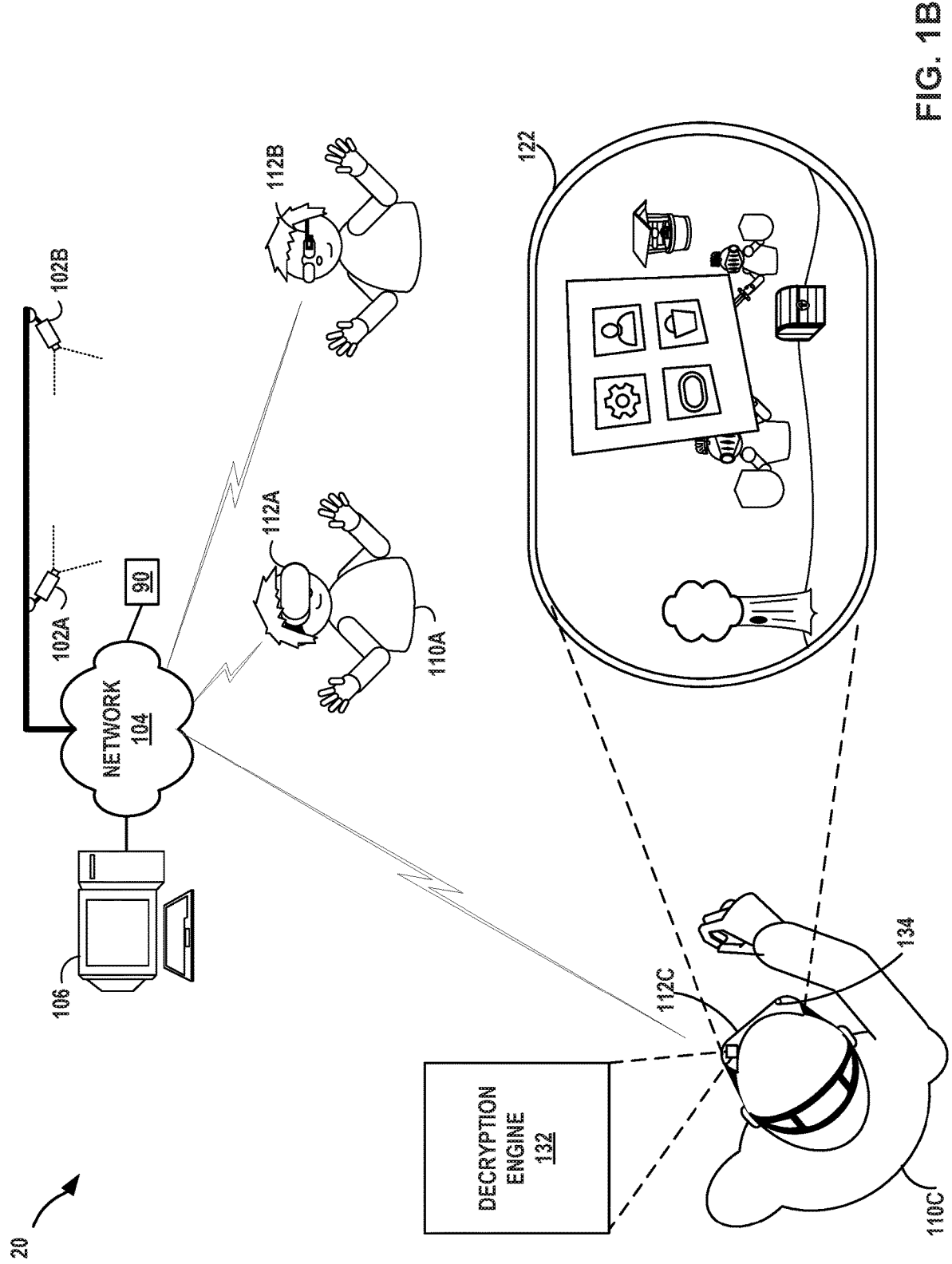
FIG. 1B is an illustration depicting another example artificial reality system that implements scalable, partitioned decryption of encrypted digital content in accordance with aspects of this disclosure.

FIG. 1B is an illustration depicting another example artificial reality system 20 that implements scalable, partitioned decryption of encrypted digital content in accordance with aspects of this disclosure. Similar to artificial reality system 10 of FIG. 1A, decryption engine 132 of FIG. 1B may implement the scalable, partitionable decryption techniques of this disclosure to reduce energy consumption while preserving decryption integrity with respect to the data ultimately rendered for an artificial reality experience.

In the example of FIG. 1B, artificial reality system 20 includes external cameras 102A and 102B (collectively, "external cameras 102"), HMDs 112A-112C (collectively, "HMDs 112"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user 110. That is, in this example, the artificial reality application constructs artificial content by tracking and computing pose information for a frame of reference for each of HMDs 112. Artificial reality system 20 uses data received from cameras 102 and HMDs 112 to capture 3D information within the real-world environment, such as motion by users 110 and/or tracking information with respect to users 110, for use in computing updated pose information for a corresponding frame of reference of HMDs 112.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may each operate substantially similar to HMD 112 of FIG. 1A. HMD 112A may also operate substantially similar to HMD 112 of FIG. 1A and receive user inputs by tracking movements of hands 132A, 132B of user 110A. HMD 112B may operate similarly.

While shown in FIG. 1B and described above as being included in HMD 112C, decryption engine 132 may be included in console 106 in some examples. In these examples, console 106 invokes decryption engine 132 to perform the partitioned decryption of encrypted data received over network 104, and communicates the decrypted output of decrypted engine 132 to one or more of HMDs 112. A content provider may implement encryption techniques of this disclosure that are generally reciprocal to the dynamically-reconfigurable decryption techniques described above with respect to decryption engine 132.

Figure 2A:
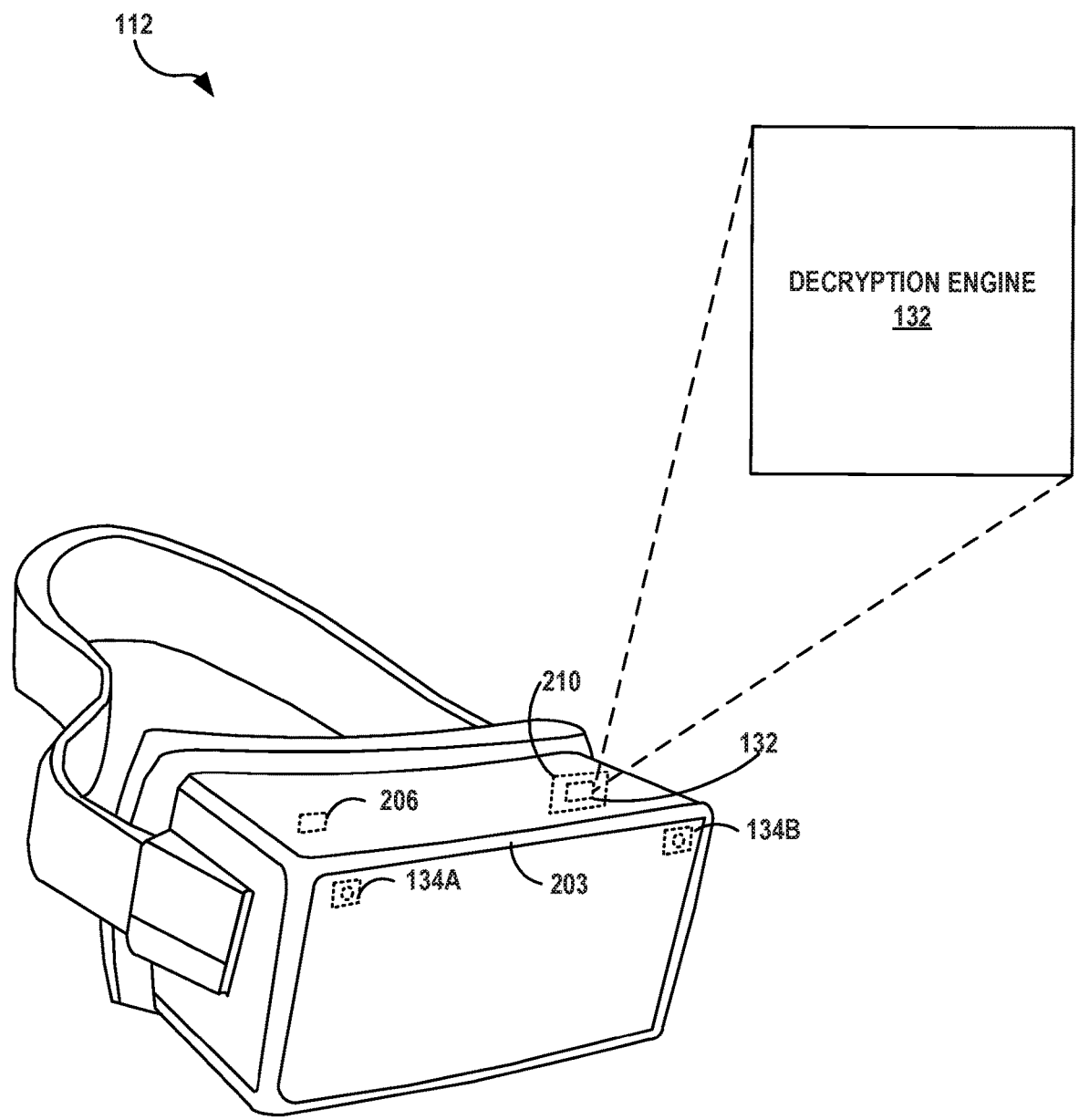
FIG. 2A is an illustration depicting an example HMD configured to decrypt and render encrypted artificial reality content in accordance with the techniques of the disclosure.

FIG. 2A is an illustration depicting an example HMD 112 configured to decrypt and render encrypted artificial reality content in accordance with the techniques of the disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein. In the example of FIG. 2A, HMD 112 takes the general form factor of a headset.

In this example, HMD 112 includes a front rigid body and a band to secure HMD 112 to a user. In addition, HMD 112 includes an interior-facing electronic display 203 configured to present artificial reality content to the user. Electronic display 203 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar, or sonar that output data indicative of distances of HMD 112 from various objects, or other sensors that provide indications of a location or orientation of HMD 112 or other objects within a physical environment. Moreover, HMD 112 may include integrated image capture devices 134A and 134B (collectively, "image capture devices 134"), such as video cameras, laser scanners, Doppler® radar scanners, depth scanners, or the like, configured to output image data representative of the physical environment.

FIG. 2B is an illustration depicting another example of HMD 112 configured to operate in accordance with the techniques of the disclosure. HMD 112 of FIG. 2B may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein. In the example of FIG. 2B, HMD 112 takes the general form factor of glasses.

In this example, HMD 112 includes a front rigid body and two stems to secure HMD 112 to a user, e.g., by resting over the user's ears. In addition, HMD 112 includes an interior-facing electronic display 203 configured to present artificial reality content to the user. Electronic display 203 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

Electronic display 203 may be split into multiple segments, such as into two segments, each segment corresponding to a separate lens disposed on the rigid front body of HMD 112 in the example of FIG. 2B. In other examples, electronic display 203 may form a contiguous surface that spans both lenses and the lens-connecting bridge (i.e., the over-the-nose portion) of the rigid front body of HMD 112 in the example of FIG. 2B. In some examples, electronic display 203 may also encompass portions of HMD 112 that connect the lenses of the front rigid body to the stems, or optionally, portions of the stems themselves, in the example form factor illustrated in FIG. 2B. These various designs of electronic display 203 in the context of the form factor of HMD 112 shown in FIG. 2B improve accessibility for users having different visual capabilities, eye movement idiosyncrasies, etc. Elements of FIG. 2B that share reference numerals with elements of FIG. 2A perform like-functionalities, and are not described separately with respect to FIG. 2B for the sake of brevity.

In the examples illustrated in FIGS. 2A & 2B, control unit 210 of HMD 112 includes decryption engine 132 illustrated in FIGS. 1A & 1B. Control unit 210 may, for example, comprise any combination of one or more processors, one or more field programmable gate arrays (FPGAs), one or more application specific integrated circuits (ASICs), and one or more application specific standard products (ASSPs). Control unit 210 may also comprise memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors to control decryption engine 132 (e.g., by controlling timing or other operational parameters) to perform the efficient network management techniques described in this disclosure.

Thus, control unit 210 may represent hardware or a combination of hardware and software to support the below described components (e.g., decryption engine 132), modules, elements, or operations. In examples in which decryption engine 132 is formed as an integrated circuit (IC), decryption engine 132 represents a "decryption IC." As such, the term "decryption IC" is used at various parts of this disclosure interchangeably with decryption engine 132. Similarly, an "encryption IC" of this disclosure represents an example of an encryption engine of this disclosure, and may be integrated with a decryption IC or may be implemented separately from a decryption IC, in various examples.

Figure 2C:
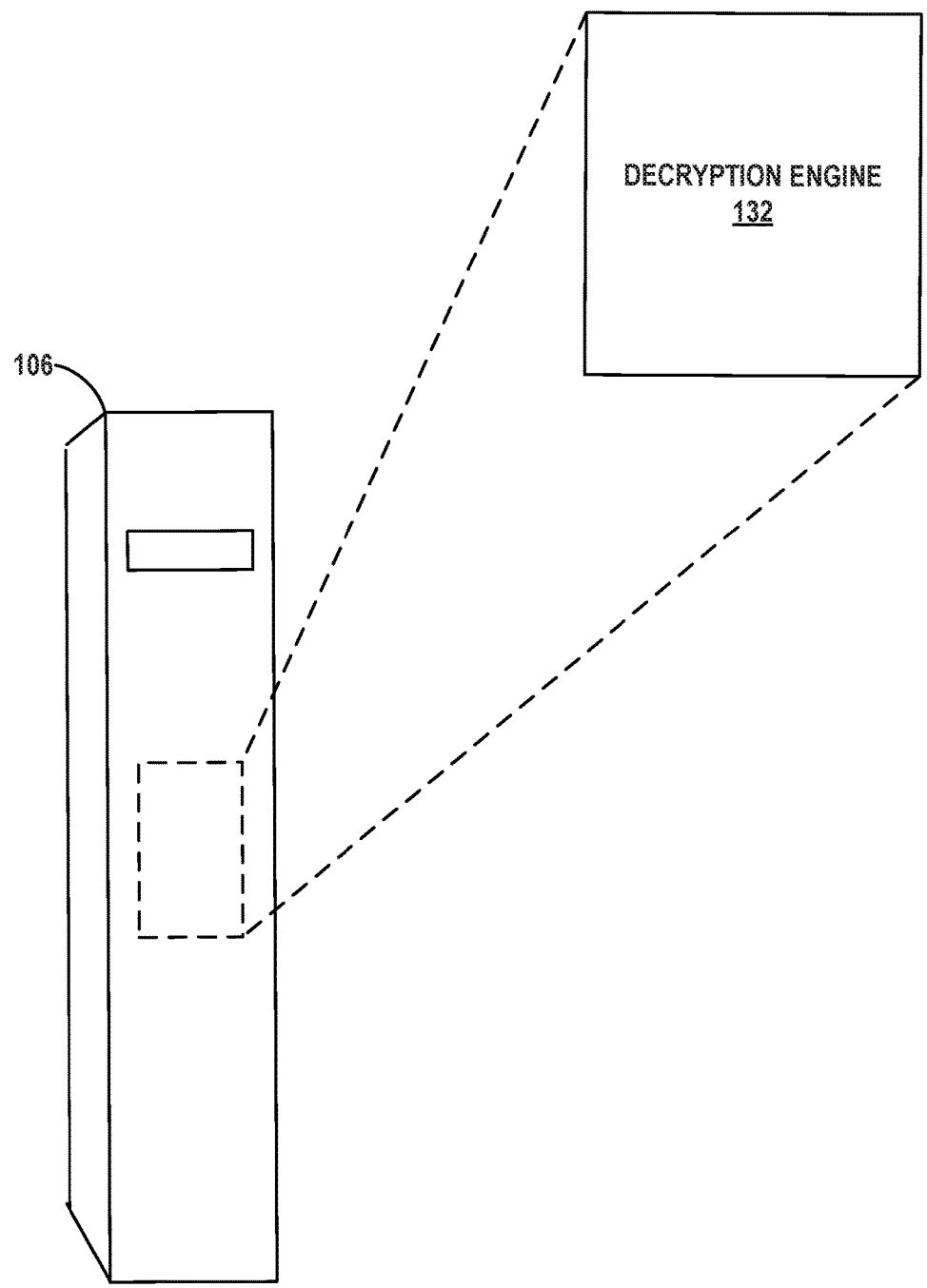
FIG. 2C is an illustration depicting an example of a console configured to operate in accordance with the techniques of the disclosure.

FIG. 2C is an illustration depicting an example of console 106 being configured to decrypt and render encrypted artificial reality content in an SCA-resistant manner in accordance with the techniques of the disclosure. In the example illustrated in FIG. 2C, decryption engine 132 is part of console 106, instead of being implemented in HMD 112 as in the examples of FIGS. 2A & 2B. Decryption engine 132 may implement the in-decryption shuffling operations described above with respect to FIGS. 2A & 2B, but in the context of console 106, in the example of FIG. 2C. As such, whether implemented within HMD 112 or within console 106 that provides decrypted content to HMD 112, decryption engine 132 may implement the data shuffling-based decryption operations of this disclosure to create misalignments in the power traces collected by SCA analyzer 126, thereby disrupting the data arrangement that SCA analyzer 126 relies on to carry out a CPA. In this way, decryption engine 132 implements the techniques of this disclosure to improve data security in a variety of configurations with which artificial reality systems 10 and 20 are compatible.

In the examples of FIGS. 2A-2C, as described above with respect to FIGS. 1A & 1B, decryption engine 132 may be configured in accordance with aspects of this disclosure to decrypt encrypted data using partitions that divide the AES-compliant decryption datapath to form four separate sub-datapaths, such that no two of the sub-datapaths have any data interdependencies with one another. For example, decryption engine 132 may include a partitioned 128-bit AES decryption datapath such that the datapath is split into four respective 32-bit inverse mix columns or backward mix columns that do not share data across any of their respective partitions.

In some examples, decryption engine 132 may split its master clock into four separate internal clocks, with each of the internal clocks providing timing control for a respective sub-datapath. In these examples, decryption engine 132 may set a timing frequency separately for each of the four internal clocks. For instance, decryption engine 132 may operate one or more of the four discrete internal clocks at reduced (i.e. less than full) frequencies. By operating at least one of the internal clocks at a reduced frequency for at least some period of time, decryption engine 132 may reduce power consumption on an engine-wide basis during decryption.

In some implementations, decryption engine 132 may incorporate energy-saving glitch suppression designs of this disclosure. Glitch-suppressing design aspects of this disclosure enable decryption engine 132 to implement an altered processing pipeline by which asymmetric signals are synchronized within each inverse Sbox component of the decryption datapath. For example, the glitch-suppressing configurations of this disclosure enable decryption engine 132 to alter the use of existing latch infrastructure of a given inverse Sbox to synchronize signals and reduce the occurrence of switching activity within that particular inverse Sbox.

By incorporating the glitch-suppressing design attributes of this disclosure, decryption engine 132 enables artificial reality system 10 to reduce power consumption expended during the process of decrypting encrypted data received over network 104, while preserving the integrity and quality of the decrypted output itself. Decryption engine 132 may implement the partitioned decryption datapath of this disclosure, or may implement the glitch-suppressing inverse Sbox configurations of this disclosure, or may implement both, in various examples.

Figure 3:
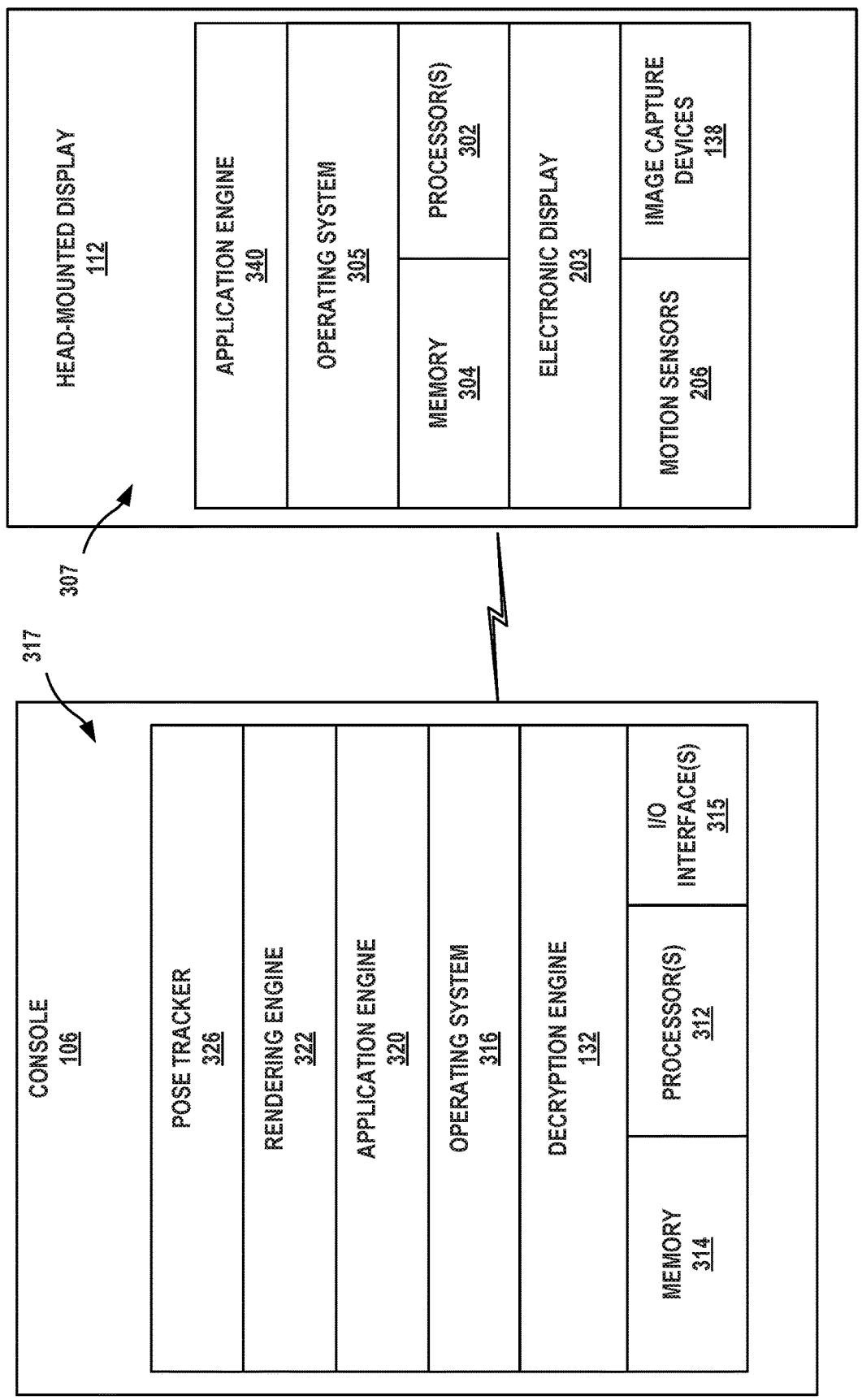
FIG. 3 is a block diagram showing example implementations of a console and an HMD of the artificial reality systems of FIGS. 1A & 1B.

FIG. 3 is a block diagram showing example implementations of console 106 and HMD 112 of artificial reality systems 10 & 20 of FIGS. 1A & 1B. In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A & 2B, processors 302 are coupled to electronic display 203, motion sensors 206 and image capture devices 134. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or HMD 112 to perform motion detection, user interface generation, and various other artificial reality-related functionalities for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, WiFi®, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), processing circuitry (e.g., fixed function circuitry or programmable circuitry or any combination thereof) or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an overall artificial reality application. In this example, software applications 317 include application engine 320, rendering engine 322, and pose tracker 326. In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (shown in FIGS. 1A & 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

In the example of FIG. 3, console 106 includes decryption engine 132, which is described above with respect to FIGS. 1A-2B. For example, console 106 may receive encrypted data from an external system (e.g., an upstream streaming service), and may invoke decryption engine 132 to decrypt the encrypted data received. Rendering engine 322 may then render the decrypted data, and console 106 may provide the rendered data to HMD 112 in form of artificial reality content 122. Decryption engine 132 implements dynamic reconfigurations in accordance with aspects of this disclosure to selectively enable or disable one or more data sub-paths included in decryption engine 132. In some examples, decryption engine 132 may adaptively change between different decryption modes to conserve energy while maintaining decryption integrity. For example, decryption engine 132 may switch between different decryption mode options that include a "full" decryption mode and a "sample" decryption mode. Decryption engine 132 may select the decryption mode based on various stimuli, including mode indications received from the reciprocal encryption device, local determinations of how many and/or which frames are encrypted as opposed to being received in unencrypted format, user inputs, audio quality, data sensitivity information, etc.

When operating in the full encryption mode, decryption engine 132 may decrypt all of the input or passthrough data. When operating in the sample decryption mode, decryption engine 132 may decrypt only a select subset of the input or passthrough data. Described in the context of a video stream portion of an artificial reality experience, decryption engine 132 may decrypt all frames of the video data while operating in full decryption mode, but may decrypt only a subset of the video frames while operating in the sample decryption mode. For instance, decryption engine 132 may, while operating in sample encryption mode, decrypt only so-called "i-frames" of the video stream, while skipping decryption with respect to non-i-frame data (e.g., with respect to "p-frames" and "b-frames") of the video stream.

Described in the context of the audio stream of an artificial reality experience, decryption engine 132 may encrypt only certain frames (e.g., via frame selection at or approximately at fixed sampling intervals) while skipping decryption with respect to all other audio frames that were not explicitly selected for encryption by a reciprocal encryption engine. Decryption engine 132 may alter the sampling rate with respect to audio frames in response to various stimuli, including mode indications received from the reciprocal encryption device, local determinations of how many and/or which frames are encrypted as opposed to being received in unencrypted format, user inputs, audio quality, data sensitivity information, etc.

Whether decrypting video streams, audio streams, combinations of video and audio streams, or other types of data, decryption engine 132 reduces computing resource expenditure and energy consumption by operating in sample encryption mode. That is, by limiting the volume of data that undergoes AES decryption while maintaining decryption integrity by decrypting key frames, decryption engine 132 uses the sample decryption mode to alleviate the resource and energy usage that is otherwise required for data encryption.

According to various aspects of this disclosure, decryption engine 132 comprises a plurality of decryption sub-datapaths, such that each respective decryption sub-datapath of the plurality has no data interdependency with respect to any other decryption sub-datapath of the plurality. Decryption engine 132 may decrypt the block of encrypted data by selectively enabling one or more decryption sub-datapaths of the plurality of decryption sub-datapaths. In some examples, decryption engine 132 may implement these techniques to partition an AES-compliant 16-byte (128-bit) block of encrypted input data into four equal-length sub-blocks or "words," and perform AES decryption operations on the four words with no data interdependency between any two of the four words. That is, decryption engine 132 may "silo" each of four encrypted four-byte (32-bit) words to be processed concurrently and independently to decrypt the overall 16-byte encrypted input. Decryption engine 132 may also apply the techniques of this disclosure with respect to various AES-compliant key sizes, such as 24-byte or 32-byte cipher key sizes.

In some examples, decryption engine 132 may also modify the inverse substitute box ("Sbox") stage of the AES-compliant encryption process to mitigate or potentially even remove in-Sbox glitches arising from asymmetric signals. For instance, decryption engine 132 may be configured according to aspects of this disclosure such that each inverse Sbox unit implements combinatorial logic instead of implementing the AES-specified lookup table ("LUT") or inverse LUT used for decryption purposes. For example, decryption engine 132 may be configured such that each inverse Sbox unit passes incoming signals through one or more primary (or "master") latches, while bypassing any secondary (or "slave") latches. In this way, decryption engine 132 may use the master latches as a signal stabilizing mechanism, thereby providing relatively synchronized signal pairs to a downstream (in-Sbox) multiplication unit.

By providing these synchronized signals to the downstream logic element (namely, the multiplication unit), each inverse Sbox unit of decryption engine 132 may reduce or potentially eliminate switching activity that the multiplication unit is invoked to perform. In turn, by reducing the switching activity of the respective multiplication unit of each Sbox, decryption engine 132 may reduce the power consumption of the respective inverse Sbox unit. When spread across four inverse Sbox units and repeated over numerous passes of data decryption, the glitch-suppressing inverse Sbox design of this disclosure yields significant power savings and energy conservation at console 106.

Figure 4:
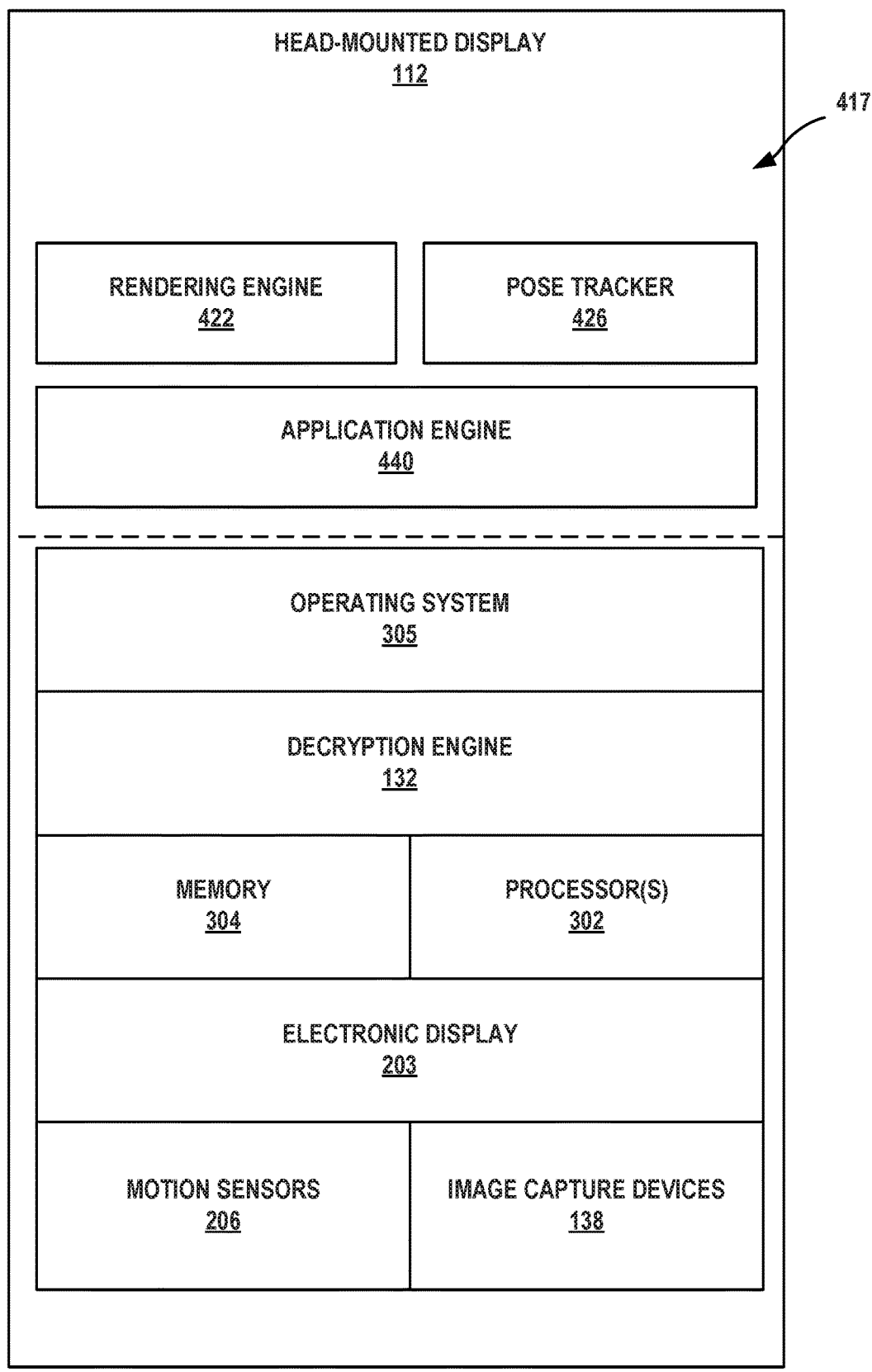
FIG. 4 is a block diagram depicting an example implementation of an HMD of the artificial reality systems of FIGS. 1A & 1B.

FIG. 4 is a block diagram depicting an example implementation of HMD 112 of artificial reality systems 10 & 20 of FIGS. 1A & 1B. In this example, as in the example of FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 134.

In the example of FIG. 4, software components 417 operate to provide an overall artificial reality application. In this example, software applications 417 include application engine 440, rendering engine 422, and pose tracker 426. In various examples, software components 417 operate similar to the counterpart components of console 106 of FIG. 3 (e.g., application engine 320, rendering engine 322, and pose tracker 326) to construct the artificial content for display to user 110. In some examples, rendering engine 422 constructs the 3D, artificial reality content which may be overlaid, at least in part, upon the real-world, physical environment of user 110.

In the example of FIG. 4, HMD 112 includes decryption engine 132, which is described above with respect to FIGS. 1A-3. For example, HMD 112 may receive encrypted data directly over network 104, or via an intermediate device, such as console 106, that may relay the encrypted data, in encrypted form, to HMD 112. HMD 112 invokes decryption engine 132 to decrypt and reconstruct the encrypted data to obtain renderable data in the form of artificial reality content 122. The configuration of decryption engine 132 is described above with respect to FIG. 3, and for the sake of brevity, is not repeated with respect to FIG. 4. The power savings provided by these configurations of decryption 132 may significantly improve the performance of HMD 112, especially in cases where HMD 112 operates on battery stores.

Figure 5:
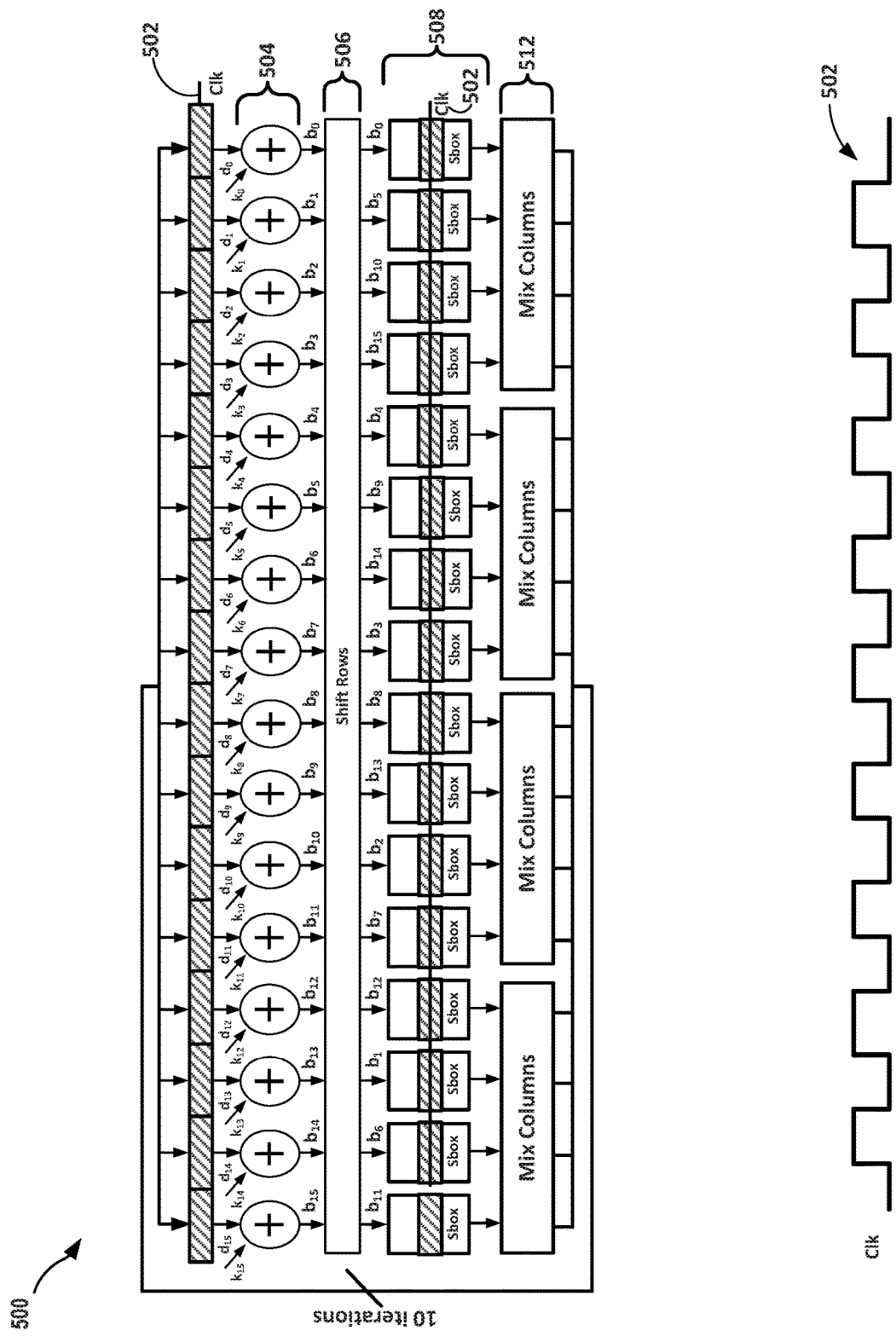
FIG. 5 is a conceptual diagram illustrating an example of AES-compliant decryption.

FIG. 5 is a conceptual diagram illustrating an example of AES-compliant decryption. The process and structure illustrated in FIG. 5 is referred to herein as AES round datapath 500. An AES-compliant encryption engine may implement AES round datapath 500 to decrypt an input block of cipher text, by performing inverse operations with respect to a reciprocal encryption datapath that generates cipher text from unencrypted input data. Various aspects of AES round datapath 500 operate according to master clock 502. The clock rate of master clock 502 is described as being at a "full frequency" in the implementation illustrated in FIG. 5. According to AES round datapath 500, a 16-byte (128-bit) input is provided, on a per-byte basis, to sixteen adder units as part of "add round key" step 504. In add round key step 504, each byte of the data input is added to a cipher key or inverse cipher key obtained using Rijndael's key schedule. Each input byte-key pair is shown in FIG. 5 using a "d-k" notation, using subscripts to delineate the different input bytes and the different inverse cipher keys.

The sixteen output bytes (denoted using a "b" notation with unique subscripts) of add round key step 504 are then shifted cyclically by various offsets in a shift rows step 506.

The shift rows step 506 cyclically shifts the bytes in each row by a certain offset determined for that particular row. In the shift rows step 506, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 506 includes shifted data from a column of the input data. The right-shifting operations described with respect to shift rows step 506 are generally reciprocal to left-shifting operations that are performed by a reciprocal AES-compliant encryption datapath.

The structure of the data output by the shift rows step 506 does not permit for independently operating on separate segments of the original 16-byte input, because data produced from four different block ciphers may be included in each four-byte run of the data output by the shift rows step 506. The shift rows step 506 is an iterative process that is performed in multiple passes, which, in the particular example of FIG. 5, is a ten-iteration step.

Each respective output byte of the shift rows step 506 is then passed through a respective substitute byte (Sbox) unit as part of inverse byte substitution step 508. The decryption datapath of FIG. 5 implements inverse byte substitution step 508 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution step 508 addresses non-linearity in the cipher code received as input for AES round datapath 500.

The byte-substituted outputs of the sixteen inverse Sbox units are then provided to an array of mix columns units for performance of mix columns step 512. AES round datapath 500 includes four mix columns units, each of which receives, as input, the outputs of four contiguous inverse Sbox units. As such, each mix columns unit processes a four-byte input as part of mix columns step 512. In mix columns step 512, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 512. Each mix columns unit of AES round datapath 500 processes the respective input column using matrix multiplication such that every single input byte affects all four output bytes. In a reciprocal encryption process, the combination of the reciprocal shift rows step and mix columns step provides diffusion in the cipher operation set.

As discussed above with respect to shift rows step 506, AES round datapath 500 relies on data interdependencies between the various byte units being processed, and may therefore introduce data interdependencies between byte units that are fed to different mix columns units during mix columns step 512. As shown, various steps of AES round datapath 500 are controlled by master clock 502, which, in turn, operates at full frequency throughout the lifecycle of AES round datapath 500, to provide maximum decryption throughput.

Figure 6:
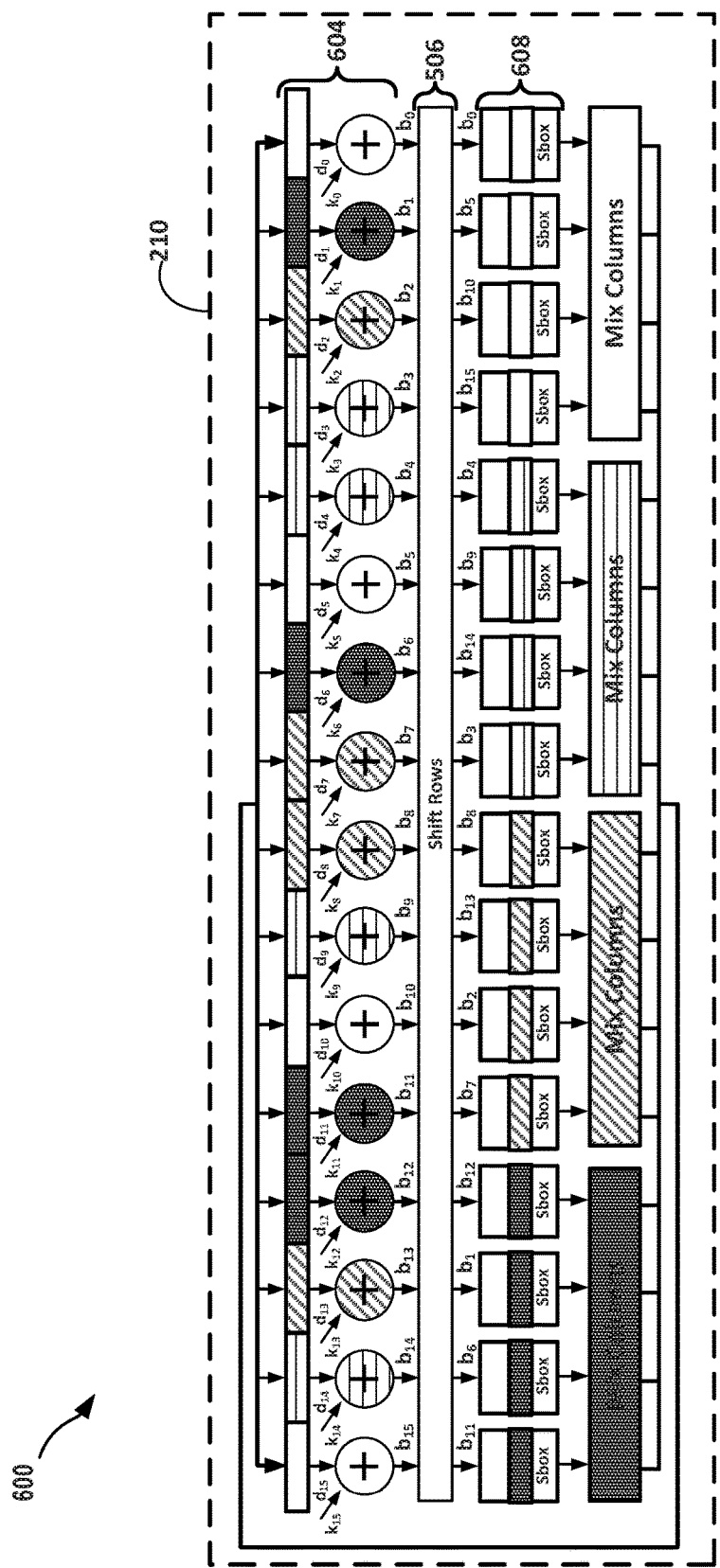
FIG. 6 is a conceptual diagram illustrating an example partitioned AES-compliant datapath of this disclosure.

FIG. 6 is a conceptual diagram illustrating an example partitioned AES-compliant AES datapath 600 of this disclosure. The process and structure illustrated in FIG. 6 is referred to herein as partitioned AES datapath 600. Decryption engine 132 is, in some examples, configured to implement partitioned AES datapath 600 to process each AES-defined block of encrypted input data in the form of discrete sub-blocks along non-interdependent sub-datapaths, in accordance with this disclosure. Aspects of partitioned AES datapath 600 are described herein as being implemented by control unit 210 illustrated in FIGS. 2A and 2B. Decryption engine 132 may process cipher text using various AES-defined key sizes, such as 128-bit, 192-bit, or 256-bit sized cipher keys. For example, decryption engine 132 may implement the techniques of this disclosure to decrypt a 128-bit block of encrypted data in the form of four discrete 32-bit sub-blocks, in accordance with some aspects of this disclosure. That is, decryption engine 132 may have partitions that divide AES round datapath 500 of FIG. 5 into four separate sub-datapaths, and may process each sub-datapath without data dependency on any other sub-datapath of the four. Additionally, decryption engine 132 maintains the data processing structure specified in the AES with respect to each sub-datapath, thereby preserving AES compliance with respect to overall decryption integrity.

For example, according to partitioned AES datapath, decryption engine 132 may implement the AES-specified steps of round key derivation, round key addition, inverse byte substitution, and linear mixing, but may implement this AES-compliant series of processing steps with respect to four separate 32-bit sub-blocks of each 128-bit block received as an encrypted input. That is, decryption engine 132 may obtain a round key from an inverse cipher key schedule (e.g., Rijndael's key schedule) and add each byte (8-bit sequence) of each 32-bit sub-block to a respective block of the obtained round key, using a bitwise XOR operation.

The partitioning of the 16-byte data input and the application of the individual inverse round keys are collectively shown in partitioned AES datapath 600 as partitioned round key addition step 604. Decryption engine 132 implements partitioned round key addition step 604 of this disclosure by dividing the original 16-byte block of encrypted input data into four categories, with exactly four bytes of the original encrypted input being assigned to each category. The four categories are shown in partitioned round key addition step 604 by way of a unique shading pattern for each category. As shown in FIG. 6, decryption engine 132 partitions the original 16-byte encrypted input such that the first contiguous four-byte run includes one byte of each category, as is the case with each of the second, third, and fourth contiguous four-byte runs. Decryption engine 132 implements partitioned AES datapath 600 in a pipelined manner, through the use of various computational stages, which are described below.

Decryption engine 132 uses a different arrangement of categories within each contiguous four-byte run, as shown by the right-shifted pattern of the shading arrangements in each consecutive four-byte run in the computational stage shown as partitioned round key addition step 604. The adder units are shaded in FIG. 6 in coordination with the corresponding category of the respective encrypted input byte. Decryption engine 132 arranges the categories in the illustrated sequences in each four-byte run in such a way that the AES-specified shift rows step 506 produces an output in which all four bytes of each category are arranged in contiguous four-byte sequences, upon completion of the shifting operations of shift rows step 506. After completion of the round key addition, decryption engine 132 may perform a transposition step by cyclically shifting the last three rows of each 32-bit sub-block by a certain number of steps. The transposition step is also referred to as a "shift rows" or "shiftrows" operation in accordance with the AES.

After completing the shifting operations of shift rows step 506, decryption engine 132 passes each 32-bit sub-block through another computational stage shown as inverse substitute byte (Sbox) stage 608. According to some examples of this disclosure, decryption engine 132 may implement inverse Sbox stage 608 with adaptive signal glitch-mitigation enhancements over the existing technology described in the AES. For example, decryption engine 132 may implement an adaptive pipelining scheme to suppress glitch propagation that often arises from switching activity associated with LUT-based inverse Sbox units, such as those described above with respect to FIG. 5. That is, decryption engine 132 may implement combinatorial and sequential logic instead of using a LUT-based functionality within each inverse Sbox unit shown in inverse Sbox stage 608.

After completion of the byte substitution in the computational stage of inverse Sbox stage 608, decryption engine 132 implements another computational stage shown as MixColumns step, in which decryption engine 132 performs inverse linear transformation operations with respect to the data output by the multiple inverse Sbox units. That is, each mix columns unit of decryption engine 132 performs the inverse linear transformation operations using, as inputs or operands, the shifted, byte-substituted data received from a sub-group of inverse Sbox units shown FIG. 6 as part of inverse Sbox stage 608. In compliance with AES-defined technology, each mix columns unit of decryption engine 132 performs matrix multiplication, using a four-byte input received from four inverse Sbox units, as one operand, and a predetermined fixed matrix, as set forth in the AES.

As described above, decryption engine 132 is configured, according to some aspects of this disclosure, to partition the original 128-bit encrypted data block input into four discrete, equally-sized sub-blocks, and to operate independently on each of the resulting 32-bit encrypted sub-blocks without cross-dependency of data operations. Because the AES specifies a four-byte (32-bit) input for each mix columns unit, decryption engine 132 implements four mix columns units with respect to each 128-bit data input. In accordance with the partitionable decryption data pipeline technology of this disclosure, decryption engine 132 is configured to provide each mix columns unit with an input corresponding to a discrete 32-bit (four-byte) sequence that was partitioned in a non-interdependent way before inverse round key addition. That is, decryption engine 132 is configured to perform the inverse linear transformation separately on four 32-bit sub-blocks, without any data interdependency between any two of the four mix columns operation sets being implemented.

For example, decryption engine 132 may implement the prior computational stage of the shift rows transposition step in such a way that each contiguous sequence of four inverse Sbox units of the Sbox computational stage receives four bytes that were added to the same round key cipher prior to shift rows step 506. Because the sixteen inverse Sbox units are aligned in such as a way that the first four Sbox units receive byte inputs obtained via addition with a first round key inverse cipher, the second series of four Sbox units receive byte inputs obtained via addition with a second round key inverse cipher, and so on, each mix columns unit receives a four-byte input, all of which was deciphered using the same inverse round key. According to the configurations of this disclosure, decryption engine 132 processes each four-byte (32-bit) encrypted sub-block independently, because each of the four-byte sub-blocks is: (i) ciphered using a round key that is not derived from the round key used for any other sub-block; (ii) passed through individual one-byte Sbox units; and (iii) grouped for the mix columns transposition on a per-round key basis. In this way, decryption engine 132 is configured to encrypt each four-byte sub-block without any data interdependencies between the respective encryption operations being performed for any two of the four-byte sub-blocks.

Based on each four-byte encrypted sub-block being processed in an independent silo (i.e., independent sub-data paths that can be independently clocked, each sub-data path providing operations such as inverse round key addition, mix columns inverse transposition, etc.), control unit 210 (which implements decryption engine 132) can leverage the configurations of this disclosure to operate each silo on a different clock phases of the reduced frequencies. For example, control unit 210 may split a master clock that controls the operation of decryption engine 132 according to existing AES technology into four sub-clocks, one for each four-byte silo. Because decryption engine 132 operates on the four encrypted four-byte silos independently of one another, control unit 210 leverages the configurations of this disclosure to set the clock rate of each sub-block on an individual basis, thereby controlling the operation of the non-interdependent sub-datapaths of partitioned AES datapath 600 on a selectively-enabled basis.

For example, control unit 210 may reduce the frequency at which one of the sub-clocks runs, thereby modifying the clock frequency that controls the decryption speed for one four-byte sub-block, without affecting the clock frequencies that control the decryption speeds of the remaining three encrypted four-byte sub-blocks. In various examples, in keeping with the binary notation of clock rates, control unit 210 may reduce the clock rate of a given sub-clock by factors of negative powers of two (to half, quarter, and so on). By reconfiguring any of the sub-clocks to operate at quarter frequency, control unit 210 modifies the array of sub-clocks to collectively control decryption engine 132 to operate on a 4-byte word on each full clock cycle, and yields a 75% reduction in power usage with respect to that particular data decryption silo.

By reconfiguring any of the sub-clocks to operate at half frequency, control unit 210 modifies the array of sub-clocks to collectively control decryption engine 132 to operate on an 8-byte word on each round of the clock, and yields a 50% reduction in power usage with respect to that particular data decryption silo. When implemented across multiple data decryption silos and/or over multiple passes of decryption operations, the reduced clock rates implemented for the sub-clocks enable control unit 210 to control the timing of the operations of decryption engine 132 to conserve energy significantly, while preserving data security and maintaining compliance with the AES, with respect to the decrypted data output.

In this way, decryption engine 132 uses compartmentalized, discrete datapath circuits in order to switch between high performance and low-power operating modes in an expedient manner. Additionally, decryption engine 132 exploits the non-interdependency of the discrete datapaths to remain in a particular operating mode for significant lengths of time at a stretch, thereby alleviating power wastage caused by frequent transitions between operating modes.

Figure 7:
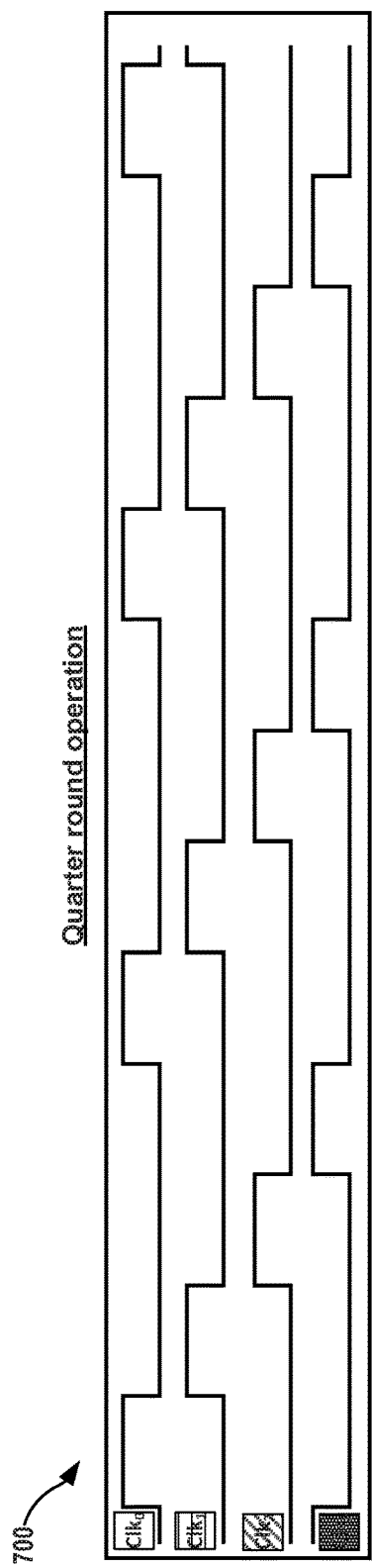
FIG. 7 is a timing diagram illustrating an example of a reduced frequency that a decryption engine may implement with respect to one or more sub-clocks, in accordance with aspects of this disclosure.

FIG. 7 is a timing diagram illustrating an example of a reduced frequency that decryption engine 132 may implement with respect to one or more sub-clocks, in accordance with aspects of this disclosure. In comparison to the full frequency operation illustrated with respect to master clock 502 in FIG. 5, each individual sub-clock operates at quarter round precision according to timing scheme 700 of FIG. 7. According to timing scheme 700, decryption engine 132 implements four internal clocks ($Clk_0$ through $Clk_3$), with each internal clock toggling from trough to crest in one out of every four clock cycles. In the example of timing scheme 700, decryption engine 132 staggers the toggling of the four internal clocks such that only one internal clock is activated during a concurrent clock cycle, thereby operating the decryption engine in a word serial manner in which a different word of the current round operation is output each clock cycle by a different, corresponding sub-data path such that the result (four words) is produced over four clock cycles.

Using the staggered quarter round clock toggling mechanism of timing scheme 700, decryption engine 132 processes the original 16-byte encrypted input block in 4-byte increments during each clock cycle. As shown by the individual shading patterns shown in FIG. 7 for each of the internal clocks $Clk_0$ through $Clk_3$, decryption engine 132 may correlate each of the internal clocks $Clk_0$ through $Clk_3$ to a different category of four-byte encrypted sub-blocks obtained via the partitioning techniques of this disclosure. By correlating each of the quarter-round frequency internal clocks to a four-byte word of the overall 16-byte encrypted input, and by staggering the activation of the four internal clocks in the manner shown in timing scheme 700, decryption engine 132 processes a single four-byte word at a time, transitioning to a new four-byte word at the next clock cycle. By operating on a single four-byte word at a given time, decryption engine 132 uses timing scheme 700 yields a 75% reduction in power consumption in comparison to the existing AES decryption mechanism shown in and described with respect to FIG. 5.

Figure 8:
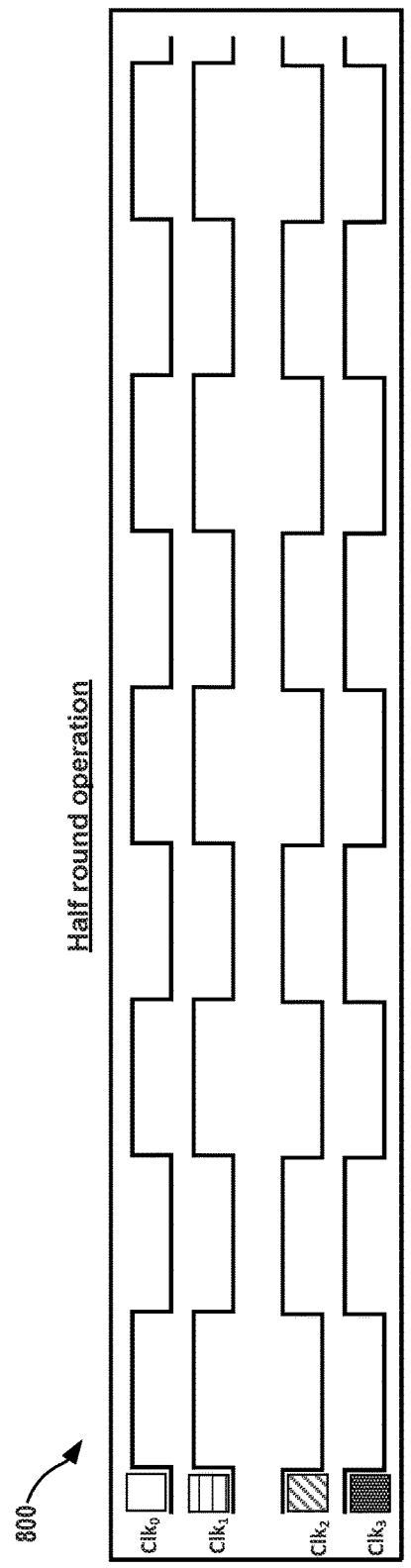
FIG. 8 is a timing diagram illustrating an example of another reduced frequency that a decryption engine may implement with respect to one or more sub-clocks, in accordance with aspects of this disclosure.

FIG. 8 is a timing diagram illustrating an example of another reduced frequency that decryption engine 132 may implement with respect to one or more sub-clocks, in accordance with aspects of this disclosure. In comparison to the full frequency operation illustrated with respect to master clock 502 in FIG. 5, each individual sub-clock operates at half round precision according to timing scheme 800 of FIG. 8. According to timing scheme 800, decryption engine 132 implements four internal clocks ($Clk_0$ through $Clk_3$), with each internal clock toggling from trough to crest in every other (i.e. one out of every two) clock cycles. In the example of timing scheme 800, decryption engine 132 staggers the toggling of the four internal clocks such that only two internal clocks are activated during a concurrent clock cycle, thereby operating the decryption engine in a word serial manner in which two different words of the current round operation are output each clock cycle by a different, corresponding sub-data path such that the result (four words) is produced over two clock cycles.

Using the staggered quarter round clock toggling mechanism of timing scheme 800, decryption engine 132 processes the original 16-byte encrypted input block in 8-byte increments during each clock cycle. As shown by the individual shading patterns shown in FIG. 8 for each of the internal clocks $Clk_0$ through $Clk_3$, decryption engine 132 may correlate each of the internal clocks $Clk_0$ through $Clk_3$ to a different category of four-byte encrypted sub-blocks obtained via the partitioning techniques of this disclosure. By correlating each of the half-round frequency internal clocks to a four-byte word of the overall 16-byte encrypted input, and by staggering the activation of the four internal clocks in the manner shown in timing scheme 800, decryption engine 132 processes two four-byte words at a time, transitioning to a new pair of four-byte words at the next clock cycle.

By operating on two four-byte words at a given time, decryption engine 132 uses timing scheme 800 yields a 50% reduction in power consumption in comparison to the existing AES decryption mechanism shown in and described with respect to FIG. 5. Decryption engine 132 may select between timing schemes 700, 800, or a full frequency timing scheme based on various factors, such as the present requirement with respect to data throughput. Decryption engine 132 is scalable, in that decryption engine 132 can transition between the various clock rates listed above adaptively, to respond to changes in throughput needs. In some use case scenarios, decryption engine 132 may transition between two of the above-described clock rates within a single clock cycle, thereby providing expedient scalability. In these cases, decryption engine 132 reduces the clock cycles of transient delay to one (1), as compared to hundreds in the case of engine-wide dynamic voltage scaling or dynamic frequency scaling approaches to respond to changes in throughput needs.

Although described above with respect to decryption operations, HMD 112 or console 106 may implement the partitioned datapath of this disclosure with respect to encryption operations, as well. Decryption engine 132 may be further configured to encrypt input data, or HMD 112 or console 106 may include a separate encryption engine, in various examples. The encryption engine (whether integrated into decryption engine 132 or implemented separately from decryption engine 132) may encrypt certain data before uploading the data over network 104. In various use-case scenarios, the encryption engines of this disclosure may encrypt data captured by HMD 112 before uploading to a cloud computing system for analysis.

Some non-limiting example use cases in which HMD 112 or console 106 may invoke the encryption engines of this disclosure relate to context awareness, such as if image capture devices 134 capture images that are analyzed in the cloud to generate information on the surroundings of HMD 112, such as the location, the weather, things of interest, places of interest, etc. Other non-limiting example use cases in which HMD 112 or console 106 may invoke the encryption engines of this disclosure relate to biometric identification, such as iris scans, facial feature images, etc. of user 110 captured by image capture devices 134 incorporate inward-facing cameras to be sent to a peripheral device for analysis and matching for user authentication. Still other non-limiting example use cases in which HMD 112 or console 106 may invoke the encryption engines of this disclosure relate to facial recognition of individuals other than user 110, such as to identify people in the field of view (FoV) of HMD 112.

By encrypting each four-byte sub-block of input data in an independent silo (i.e., an independent sub-datapath that can be independently clocked, each sub-data path providing operations such as round key addition, mix columns transposition, etc.), control unit 210 (which implements the encryption engines of this disclosure) can leverage the configurations of this disclosure to operate each silo on a different clock phases of the reduced frequencies. For example, control unit 210 may split a master clock that controls the operation of the encryption engines according to existing AES technology into four sub-clocks, one for each four-byte silo. Because the encryption engines of this disclosure encrypt the four four-byte silos independently of one another, control unit 210 leverages the configurations of this disclosure to set the clock rate of each sub-block on an individual basis, thereby controlling the operation of the non-interdependent sub-datapaths of an encryption datapath corresponding to partitioned AES datapath 600 on a selectively-enabled basis.

For example, control unit 210 may reduce the frequency at which one of the sub-clocks runs, thereby modifying the clock frequency that controls the encryption speed for one four-byte input sub-block, without affecting the clock frequencies that control the encryption speeds of the remaining three four-byte sub-blocks of input data. In various examples, in keeping with the binary notation of clock rates, control unit 210 may reduce the clock rate of a given sub-clock by factors of negative powers of two (to half, quarter, and so on). By reconfiguring any of the sub-clocks to operate at quarter frequency, control unit 210 modifies the array of sub-clocks to collectively control the encryption engine to operate on a 4-byte word on each full clock cycle, and yields a 75% reduction in power usage with respect to that particular data encryption silo.

By reconfiguring any of the sub-clocks to operate at half frequency, control unit 210 modifies the array of sub-clocks to collectively control the encryption engine to operate on an 8-byte word on each round of the clock, and yields a 50% reduction in power usage with respect to that particular data encryption silo. When implemented across multiple data encryption silos and/or over multiple passes of encryption operations, the reduced clock rates implemented for the sub-clocks enable control unit 210 to control the timing of the operations of the encryption engine to conserve energy significantly, while preserving data security and maintaining compliance with the AES, with respect to the encrypted data output (e.g., the encrypted data transmitted over network 104).

In this way, the encryption engines of this disclosure use compartmentalized, discrete datapath circuits in order to switch between high performance and low-power operating modes in an expedient manner. Additionally, the encryption engines of this disclosure exploits the non-interdependency of the discrete datapaths to remain in a particular operating mode for significant lengths of time at a stretch, thereby alleviating power wastage caused by frequent transitions between operating modes.

Figure 9:
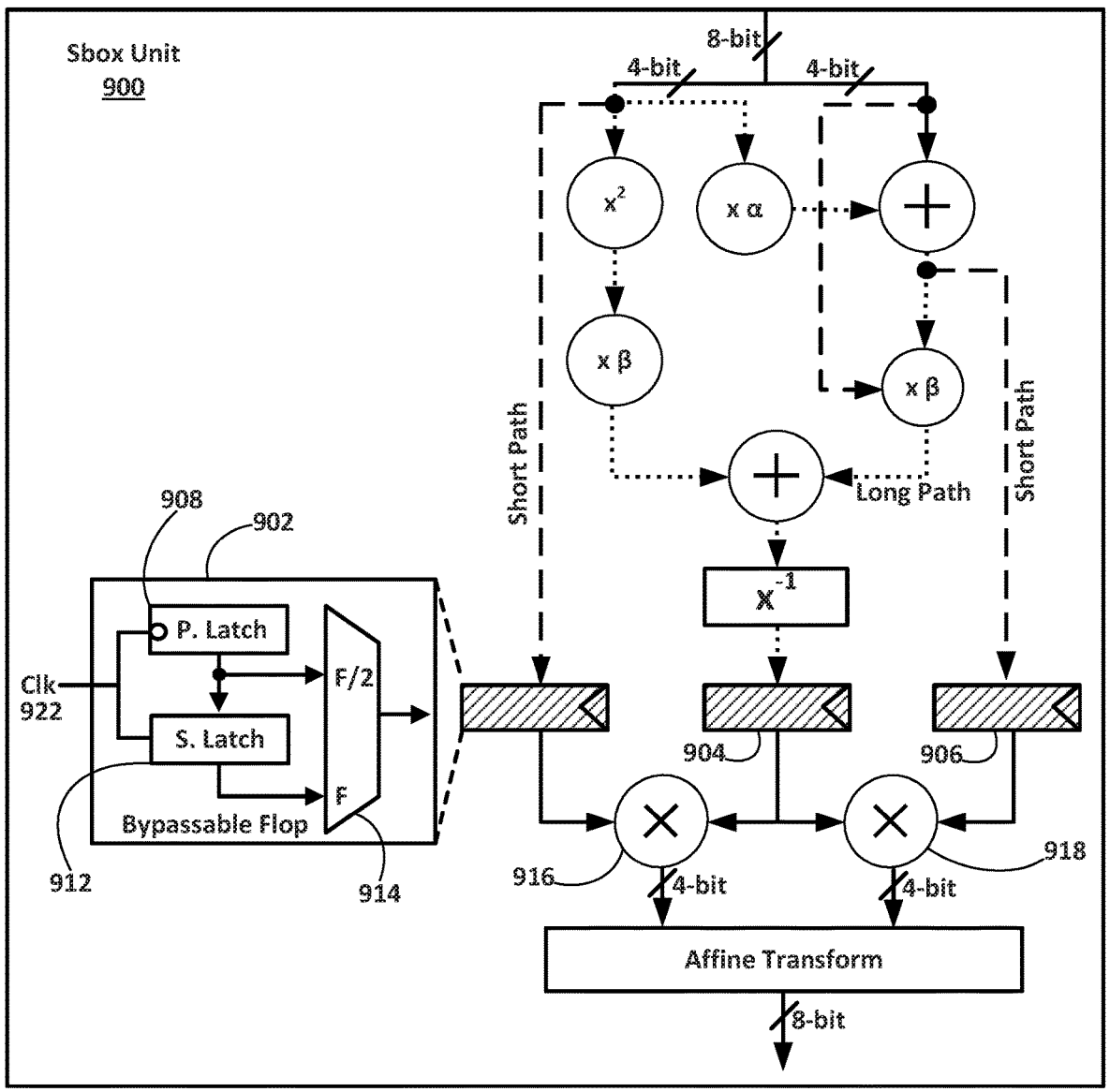
FIG. 9 is a block diagram illustrating an example byte substitution (Sbox) unit that implements glitch-suppressing signal synchronization techniques of this disclosure.

FIG. 9 is a block diagram illustrating an example byte substitution (Sbox) unit 900 that implements glitch-suppressing signal synchronization techniques of this disclosure. Sbox unit 900 represents one of an array of sixteen inverse Sbox units that collectively carry out inverse Sbox stage 608 of FIG. 6. Each of the remaining fifteen Sbox units shown in FIG. 6 may be configured similarly to Sbox unit 900. The AES specifies a LUT-based series of byte substitution operations, as described with respect to inverse Sbox stage 508 of FIG. 5. The LUT-based byte substitution of the AES introduces signal asymmetry originating at the computational stage of inverse Sbox stage 508, because while the sixteen inverse Sbox units of FIG. 5 receive their respective one-byte inputs substantially at the same time, the various inverse Sbox units may experience different lookup times. As such, signal divergence may originate at inverse Sbox stage 508 within a single sixteen-byte encrypted input that is being decrypted.

According to aspects of this disclosure, Sbox unit 900 implements combinatorial and sequential logic, instead of using a LUT, to perform byte substitution in the Sbox computational stage. Decryption engine 132 causes all signals to undergo an equal number of switching events and interconnect traversals before reaching Sbox unit 900. AES-defined Sbox operations introduce signal asymmetry, in that parallel signals that form operands for downstream logic elements arrive at the downstream logic elements at different times. According to the configurations of this disclosure, Sbox unit 900 stabilizes a first-arriving signal, thereby eliminating switching activity that a downstream logic element might otherwise be required to perform while awaiting the arrival of the second signal that provides the complementing operand from an upstream logic element (or series of upstream logic elements).

According to the glitch-suppressing configurations of this disclosure, pipelining register infrastructure is relocated from other parts of decryption engine 132 into Sbox unit 900 to function as glitch suppression registers. By implementing the glitch suppression registers in Sbox unit 900 and the remaining fifteen Sbox units of partitioned AES dapath 600, decryption engine 132 implements the configurations of this disclosure to relocate existing latch and flip flop invocation at the origination points of signal asymmetry. Sbox unit 900 uses the glitch suppression registers to stabilize one signal of an asymmetric pair while a downstream logic element awaits the arrival of the other signal of the asymmetric pair from the respective upstream logic element. By stabilizing the prior-arriving signal while awaiting the later-arriving signal, Sbox unit 900 synchronizes (or "syncs") the arrival of the signal pairs at a downstream logic element, thereby reducing or potentially even eliminating unwanted switching activity that the downstream logic element would otherwise perform.

By synchronizing the signals prior to arrival of these signal pairs at the downstream logic element, Sbox unit 900 reduces or potentially eliminates transient signal swings that may occur between clock cycles. Again, these transient signal swings often cause downstream components receiving asymmetric signal pairs to perform significant switching, and the level of the switching is directly proportional to power consumption. That is, for every increment in switching activity by a downstream logic element arising from input signal asymmetry, the power consumption of the inverse Sbox unit is incremented. Sbox unit 900 reduces power consumption by synchronizing signal pair arrival at a downstream logic element through the use of glitch suppression registers, such as bypassable flops 902-906 that are described below in greater detail. Sbox unit 900 also suppresses the propagation of signal asymmetry-based glitches downstream to the corresponding mix columns unit through the use of these glitch suppression registers.

The overall combinatorial and sequential logic of Sbox unit 900 is configured to adaptively pipeline certain signals such that operand signals are received at certain subcomponents at or approximately at the same time. By stabilizing the input signals prior to their arrivals at various individual subcomponents within Sbox unit 900, Sbox unit 900 may reduce switching activity that would otherwise be performed at the individual subcomponents in order to counteract the latency caused by input signal asymmetry. Additionally, when implemented across the sixteen Sbox units of inverse Sbox stage 608, Sbox unit 900 may function in synchrony with the remaining inverse Sbox units of the same sub-datapath portion (i.e., those Sbox unit that operate on the same sub-clock) of inverse Sbox stage 608 to reduce the propagation of any asymmetric signal-related glitches to downstream portions of partitioned AES datapath 600, namely, to the mix columns stage. In this way, Sbox unit 900 may implement the combinatorial and sequential logic of FIG. 9, along with other inverse Sbox units configured in a similar manner, to collectively stabilize the input signals to the mix columns units, thereby reducing glitch propagation caused by signal symmetry originating at inverse Sbox stage 608.

Purely for the purpose of ease of illustration, not all of the subcomponents of Sbox unit 900 are assigned individual reference numerals in FIG. 9. As one example, Sbox unit 900 receives an 8-bit (1-byte) input. Sbox unit 900 bifurcates the 8-bit input into two 4-bit words, as shown in FIG. 9. Each 4-bit word is pipelined separately, with a different set of operations being performed in each pipeline. The first 4-bit word is first raised exponentially to a power of two by a squaring unit, and the squared result is supplied to a first multiplier that uses a constant 'β' as a multiplier. The first 4-bit word is also supplied to a second multiplier that uses a constant 'α' as a multiplier.

The second 4-bit word is supplied to a first adder that adds the second 4-bit word to the output of the second multiplier discussed above. The second 4-bit word is also supplied to a third multiplier that multiplies the second 4-bit word with the output of the first adder. In turn, the outputs of the first multiplier and the third multiplier are supplied to a second adder, and the output of the second adder is supplied to an inverter. The inverter output is supplied to bypassable flop 904.

Also, as shown in FIG. 9, the first 4-bit word is supplied to bypassable flop 902, and the output of the first adder is supplied to bypassable flop 906. As measured from the bifurcation point of the original 8-bit input into the first and second 4-bit words, the inputs to bypassable flops 902 and 906 traverse a shorter logical path than the input to bypassable flop 904. More specifically, the input to bypassable flop 902 is provided directly from the bifurcation point, and the input to bypassable flop 906 traverses two logic elements (the second multiplier and the first adder) before reaching bypassable 906. In contrast, the input to bypassable flop 904 traverses a longer logical path than the other two inputs described above, because the input to bypassable flop 904 passes through seven logic elements, several of which are arranged in series. The short path traversals from the original bifurcation point to bypassable flops 902 and 906 are shown in FIG. 9 using dashed lines, while the long path traversal from the original bifurcation point to bypassable flop 904 is shown in FIG. 9 using dotted lines.

In turn, each of bypassable flops 902-906 provide their respective outputs to one or both of multiplication units 916 and 918. More specifically, as shown in FIG. 9, multiplication unit 916 receives the outputs of bypassable flops 902 and 904 as inputs, and generates a 4-bit product by multiplying the two inputs. Similarly, multiplication unit 918 receives the outputs of bypassable flops 904 and 906 as inputs, and generates a 4-bit product by multiplying the two inputs. Multiplication units 916 and 918 supply their respective outputs to an affine transform unit, which generates an 8-bit substituted output.

As shown, each of multiplication units 916 and 918 uses the long path-traversed output of bypassable flop 904 as one operand, and a short path-traversed output (of one of bypassable flops 902 or 906) as the other operand. For this reason, each respective input pair to each of multiplication units 916 and 918 exhibit signal asymmetry, because each respective pair of inputs is split between a respective short path and the single long path from the bifurcation point to the respective multiplication unit 916 or 918.

Each of bypassable flop pairs 902-904 and 904-906 is configured to implement signal stabilization according to aspects of this disclosure, to mitigate or even potentially eliminate input signal asymmetry at multiplication units 916 and 918. Input signal asymmetry would otherwise cause multiplication units 916 and 918 to perform significant switching activity in the interim between receiving the respective short path-traversed input and awaiting the long path-traversed input that will be received from the upstream logic element of the long path. This type of switching activity consumes significant energy, and also may propagate signal asymmetry-based glitches to the downstream mix columns units.

By stabilizing the respective input signals to multiplication units 916 and 918, bypassable flops 902-906 reduce overall power consumption of Sbox unit 900 significantly, in some instances by approximately 30%. For example, bypassable flop 902 may adaptively pipeline the short path-traversed input to multiplication unit 916 to arrive at or around the same time that the long path-traversed input arrives at multiplication unit 916 via bypassable flop 904. Bypassable flop 902 includes a primary latch 908, a secondary latch 912, and a multiplexer (MUX) 914. Depending on the present operation mode of decryption engine 132, as indicated by the frequency at which control unit 210 causes clock 922 to operate at present, bypassable flop 902 manipulates the operation of the above-listed subcomponents to better align the timing of the short path-traversed operand at multiplication unit 916 with the arrival of the long path-traversed operand.

Bypassable flop 902 are configured to adapt the pipelining to suit the clock rate at which control unit 210 is presently running clock 922. For instance, bypassable flop 902 may operate in flip flop mode if control unit 210 is operating clock 922 at a higher frequency clock rate. In flip flop mode, bypassable flop 902 passes data output from primary latch 908 to secondary latch 912, and MUX 914 of bypassable flop 902 outputs the data received from secondary latch 912. In contrast, bypassable flop 902 may operate in latch mode if control unit 210 is operating clock 922 at a lower frequency clock rate.

In latch mode, bypassable flop 902 may function as a transparent unit, in that MUX 914 relays the output of primary latch 908 directly, while bypassing or disabling secondary latch 912. As a non-limiting example, the two clock rates for the flip flop mode and the latch mode are illustrated within MUX 914 respectively as 'F' and 'F/2', although it will be appreciated that the reduced frequency in which bypassable flop 902 invokes latch mode operation may be reduced by a factor other than two.

Sbox unit 900 may disable bypassable flop 904, based on bypassable flop 904 processing the long path-traversed operand being supplied to multiplication unit 916. By disabling bypassable flop 904, Sbox unit 900 causes the long path-traversed signal to bypass any time-delay latching before reaching multiplication unit 916, based on the signal traversing the long path of FIG. 9. In this way, Sbox unit 900 disables bypassable flop 904 in such a way that the long path-traversed operand is supplied to multiplication unit 916 expediently, thereby reducing or potentially minimizing the signal stabilization time implemented by bypassable flop 902 with respect to the short path-traversed signal.

Bypassable flop 906 may be configured similarly to function in tandem with bypassable flop 904 in order to synchronize the input signals provided to multiplication unit 918. In this way, Sbox unit 900 incorporates combinatorial and sequential logic of this disclosure, in the form of bypassable flops 902-906 to stabilize the input signal pairs received at multiplication units 916 and 918. By stabilizing the short-path traversed signal of an input signal pair before the full input signal pair is received at either of multiplication units 916 and 918, Sbox unit 900 reduces the switching activity that multiplication units 916 and 918 would otherwise undergo due to the asymmetric receipt times of the respective input signal pairs. By reducing the switching activity caused by input signal asymmetry, Sbox unit 900 reduces power consumption of decryption engine 132.

Although described above with respect to decryption operations, HMD 112 or console 106 may implement the glitch-suppressing signal synchronization techniques of this disclosure with respect to encryption operations, as well. Encryption engines of this disclosure (whether integrated with decryption engine 132 or implemented separately from decryption engine 132) may be further configured to encrypt input data may encrypt certain data before uploading the data over network 104 in various use-case scenarios, such as in one or more of the use-case scenarios described above. By stabilizing the short-path traversed signal of an input signal pair before the full input signal pair is received at the downstream multiplication units of an encryption-side Sbox computational stage, the encryption engines of this disclosure reduce the switching activity that the downstream multiplication units would otherwise undergo due to the asymmetric receipt times of the respective input signal pairs. By reducing the switching activity caused by input signal asymmetry, the encryption-side Sbox units of this disclosure reduce power consumption in the process of encrypting input data obtained by HMD 112 before uploading the encrypted data to the cloud for analysis.

Figure 10:
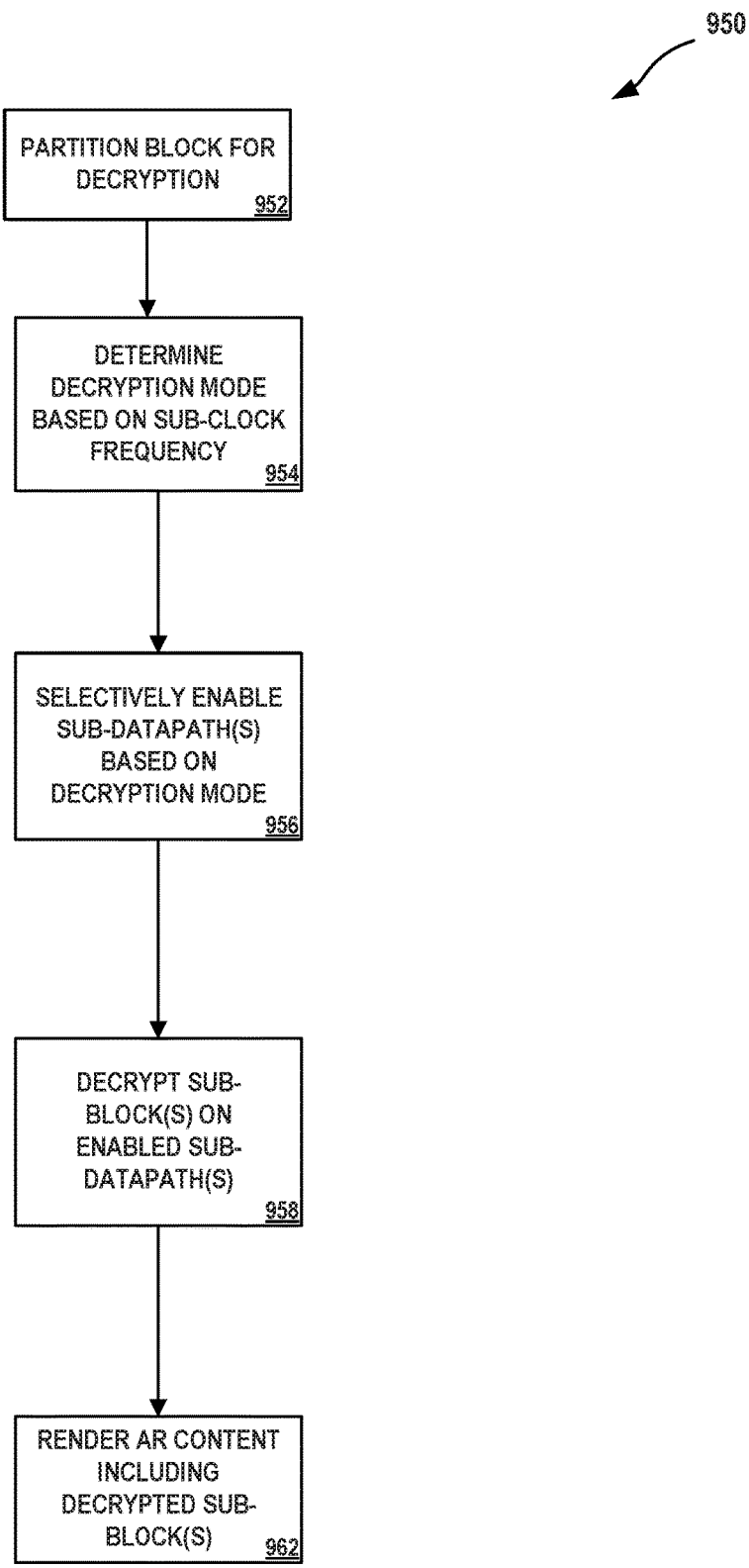
FIG. 10 is a flowchart illustrating an example process by which the artificial reality systems of FIGS. 1A & 1B utilize a decryption engine of this disclosure to decrypt and render encrypted artificial reality content.

FIG. 10 is a flowchart illustrating an example process 950 by which artificial reality systems 10 & 20 utilize decryption engine 132 to decrypt and render encrypted artificial reality content. Process 950 is described herein as being performed by artificial reality system 10 and components thereof, such as HMD 112 as an example, although it will be appreciated that other systems and components of this disclosure may perform process 950 as well, in accordance with aspects of this disclosure. According to process 950, decryption engine 132 partitions an encrypted block of data received for decryption (952). Decryption engine 132 determines a decryption mode based a frequency at which one or more sub-clocks are presently operating (954). For instance, each of the sub-clocks control the operation of one respective sub-datapath included in the overall datapath of decryption engine 132. Examples of frequencies at which the sub-clocks may operate include full, half, and quarter-round frequencies, illustrated in FIGS. 5-7 and described above.

Based on the determined decryption mode, decryption engine 132 may selectively enable one or more of the sub-datapaths illustrated in FIG. 6 and described above (956). For instance, in a full decryption mode associated with the full clock frequency, decryption engine 132 may enable all of the available decryption sub-datapaths at every clock cycle. As another example, in a sample decryption mode associated with the half-round clock frequency, decryption engine 132 may enable half of the available decryption sub-datapaths at every clock cycle. As another example, in a sample decryption mode associated with the quarter-round clock frequency, decryption engine 132 may enable a quarter of the available decryption sub-datapaths at every clock cycle.

Decryption engine 132 decrypts the respective sub-block (s) routed along each of the enabled sub-datapath(s) (958). In some examples, during the Sbox stage of the decryption process along the enabled sub-datapath(s), decryption engine 132 may synchronize signals by stabilizing a short path-traversed signal while a downstream logic element awaits receipt of a long path-traversed signal from the upstream logic element of the long path, as described above with respect to FIG. 9 and elsewhere. In these examples, decryption engine 132 uses glitch-suppression registers (e.g., in the form of bypassable flops 902-906 of FIG. 9) to synchronize the signal arrival times, to reduce or potentially even eliminated unwanted switching activity during the wait times caused by the signal asymmetry of the Sbox operations. Rendering engine 322 or rendering engine 422, as the case may be, renders artificial reality content 122 including the decrypted sub-block(s) formed by decryption engine 132 in this manner (962).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. An artificial reality system comprising:
a decryption data path having a plurality of computational stages arranged in a pipeline configured to decrypt an encrypted block of data to form a decrypted block of data, wherein at least one of the computational stages included in the pipeline of the decryption data path includes:
multiple asymmetric logical paths, wherein a first signal traverses a first logical path and a second signal traverses a second logical path having a greater number of logical units than the first logical path; and
a glitch suppression register configured to synchronize the first signal with respect to the second signal such that the first signal and the second signal arrive at the downstream logic element of the at least one computational stage of the decryption data path at substantially a same time;
wherein the first logical path and the second logical path introduce signal traversal asymmetry after an upstream logic element of the at least one computational stage of the decryption data path, and wherein the glitch suppression register is configured to synchronize the first signal and the second signal after the first signal and the second signal traverse the upstream logic element and before the first signal and the second signal arrive at the downstream logic element; and
a head-mounted display (HMD) configured to output artificial reality content including the decrypted block of data.

2. The artificial reality system of claim 1,
wherein the glitch suppression register comprises a first bypassable flop included in the first logical path, further comprising a second bypassable flop included in the second logical path, and wherein to synchronize the first signal with respect to the second signal, a control unit is configured to:
enable the first bypassable flop to process the first signal through the bypassable flop; and
disable the second bypassable flop such that the second signal bypasses the bypassable flop.

3. The artificial reality system of claim 2, further comprising a decryption engine that includes the decryption datapath, wherein the bypassable flop includes a primary latch, a secondary latch, and a multiplexer (MUX), and wherein to pass the first signal through the bypassable flop, the control unit is configured to:
based on a determination that the decryption engine is presently operating at a full frequency:
enable both of the primary latch and the secondary latch to process the first signal; and
multiplex respective outputs of the primary latch and the secondary latch.

4. The artificial reality system of claim 2, further comprising a decryption engine that includes the decryption datapath, wherein the bypassable flop includes a primary latch, a secondary latch, and a multiplexer (MUX), and wherein to pass the first signal through the bypassable flop, the control unit is configured to:
based on a determination that the decryption engine is presently operating at a reduced frequency:
enable the primary latch to process the first signal; and
disable the secondary latch from processing the first signal.

5. The artificial reality system of claim 1, wherein the upstream logic element comprises an inversion unit and the downstream logic element comprises a multiplication unit, wherein the first signal provides a first operand to the multiplication unit, and wherein the second signal provides a second operand to the multiplication unit.

6. The artificial reality system of claim 1, wherein the at least one computational stage of the decryption data path comprises a substitute byte (Sbox) unit of the decryption data path.

7. The artificial reality system of claim 1, further comprising a decryption engine that includes the decryption datapath, wherein the decryption engine is integrated into the HMD.

8. A decryption integrated circuit (IC) comprising:
an interface configured to receive an encrypted block of data; and
a decryption data path having a plurality of computational stages arranged in a pipeline configured to decrypt the encrypted block of data to form a decrypted block of data wherein at least one computational stage included in the pipeline of the decryption data path includes:
multiple asymmetric logical paths, wherein a first signal traverses a first logical path and a second signal traverses a second logical path having a greater number of logical units than the first logical path; and
a glitch suppression register configured to synchronize the first signal with respect to the second signal such that the first signal and the second signal arrive at a downstream logic element of the at least one computational stage of the decryption data path at substantially a same time;
wherein the first logical path and the second logical path introduce signal traversal asymmetry after an upstream logic element of the at least one computational stage of the decryption data path, and wherein the glitch suppression register is configured to synchronize the first signal and the second signal after the first signal and the second signal traverse the upstream logic element and before the first signal and the second signal arrive at the downstream logic element.

9. The decryption IC of claim 8, wherein the glitch suppression register comprises a first bypassable flop included in the first logical path, further comprising a second bypassable flop included in the second logical path, and wherein to synchronize the first signal with respect to the second signal, a control unit is configured to:
enable the first bypassable flop to process the first signal through the bypassable flop; and
disable the second bypassable flop such that the second signal bypasses the bypassable flop.

10. The decryption IC of claim 9, wherein the bypassable flop includes a primary latch, a secondary latch, and a multiplexer (MUX), and wherein to pass the first signal through the bypassable flop, the control unit is configured to:
based on a determination that the decryption engine is presently operating at a full frequency:
enable both of the primary latch and the secondary latch to process the first signal; and
multiplex respective outputs of the primary latch and the secondary latch.

11. The decryption IC of claim 9, wherein the bypassable flop includes a primary latch, a secondary latch, and a multiplexer (MUX), and wherein to pass the first signal through the bypassable flop, the control unit is configured to:
based on a determination that the decryption engine is presently operating at a reduced frequency:
enable the primary latch to process the first signal; and
disable the secondary latch from processing the first signal.

12. The decryption IC of claim 8, wherein the upstream logic element comprises an inversion unit and the downstream logic element comprises a multiplication unit, wherein the first signal provides a first operand to the multiplication unit, and wherein the second signal provides a second operand to the multiplication unit.

13. The decryption IC of claim 8, wherein the at least one computational stage of the decryption data path comprises a substitute byte (Sbox) unit of the decryption data path of the decryption engine.

14. An apparatus for data decryption, the apparatus comprising:
an interface configured to receive an encrypted block of data; and
a decryption data path having a plurality of computational stages arranged in a pipeline configured to decrypt the encrypted block of data to form a decrypted block of data, wherein at least one of the computational stages included in the pipeline of the decryption data path includes:
multiple asymmetric logical paths, wherein a first signal traverses a first logical path and a second signal traverses a second logical path having a greater number of logical units than the first logical path; and
a glitch suppression register configured to synchronize the first signal with respect to the second signal such that the first signal and the second signal arrive at a downstream logic element of the at least one computational stage of the decryption data path at substantially a same time;
wherein the first logical path and the second logical path introduce signal traversal asymmetry after an upstream logic element of the at least one computational stage of the decryption data path, and wherein the glitch suppression register is configured to synchronize the first signal and the second signal after the first signal and the second signal traverse the upstream logic element and before the first signal and the second signal arrive at the downstream logic element.

15. The apparatus of claim 14, wherein the glitch suppression register comprises a first bypassable flop included in the first logical path, further comprising a second bypassable flop included in the second logical path, and wherein to synchronize the first signal with respect to the second signal, a control unit is configured to:
enable the first bypassable flop to process the first signal through the bypassable flop; and
disable the second bypassable flop such that the second signal bypasses the bypassable flop.

16. The apparatus of claim 14, wherein the apparatus is a system on a chip (SoC).

17. The apparatus of claim 16, wherein the SoC is configured to support an artificial reality application.

18. An artificial reality system comprising:
a decryption data path having a plurality of computational stages arranged in a pipeline configured to decrypt an encrypted block of data to form a decrypted block of data, wherein at least one of the computational stages included in the pipeline of the decryption data path includes:
multiple asymmetric logical paths, wherein a first signal traverses a first logical path and a second signal traverses a second logical path having a greater number of logical units than the first logical path; and
a glitch suppression register configured to synchronize the first signal with respect to the second signal such that the first signal and the second signal arrive at the downstream logic element of the at least one computational stage of the decryption data path at substantially a same time;
wherein the glitch suppression register comprises a first bypassable flop included in the first logical path, further comprising a second bypassable flop included in the second logical path, and wherein to synchronize the first signal with respect to the second signal, a control unit is configured to:
enable the first bypassable flop to process the first signal through the bypassable flop; and
disable the second bypassable flop such that the second signal bypasses the bypassable flop; and
a head-mounted display (HMD) configured to output artificial reality content including the decrypted block of data.

* * * * *